United States Patent [19]

Carter

[11] 3,808,598
[45] Apr. 30, 1974

[54] AIRCRAFT COLLISION WARNING SYSTEM

[75] Inventor: Nick Grammer Carter, Pearland, Tex.

[73] Assignee: Thomas F. Robbins, Jr., Houston, Tex. ; a part interest

[22] Filed: Nov. 6, 1972

[21] Appl. No.: 303,936

[52] U.S. Cl... 343/112 TC, 235/150.23, 343/106 R, 343/112 CA
[51] Int. Cl.............................................. G08g 5/00
[58] Field of Search... 343/106 R, 112 TC, 112 CA; 235/150.23

[56] References Cited
UNITED STATES PATENTS

| | | | |
|---|---|---|---|
| 2,666,198 | 1/1954 | Wallace | 343/106 R |
| 3,130,041 | 4/1964 | Murphy | 343/106 R |
| 3,188,631 | 6/1965 | Birtley | 235/150.23 |

Primary Examiner—Maynard R. Wilbur
Assistant Examiner—Richard E. Berger

[57] ABSTRACT

In one exemplar embodiment, apparatus for providing an aircraft collision warning is disclosed. Means are provided for measuring the range and bearing of an aircraft from a ground control VORTAC station. An altimeter is provided to measure altitude. The bearing, range and altitude are encoded and transmitted as a position location message to other aircraft. The bearing information is transmitted as a function of the VOR signal and the transmission is synchronized to the VOR signal. Such position location messages are received by the receiving aircraft and decoded to obtain the bearing, range and altitude of other aircraft. A safety envelope surrounding the aircraft is selected by means provided and comprises the differential parameters of range, bearing and altitude comparison. Means are provided to compare the range, bearing and altitude of other aircraft with the differential parameters of the safety envelope, and if the range, bearing and altitude of the other aircraft are within the safety envelope selected, then means are provided for visually and audibly warning the receiving aircraft pilot. Additionally, the apparatus may comprise visual display means to visually display the other aircraft with respect to the receiving aircraft or both aircraft with respect to the ground VORTAC station.

13 Claims, 18 Drawing Figures

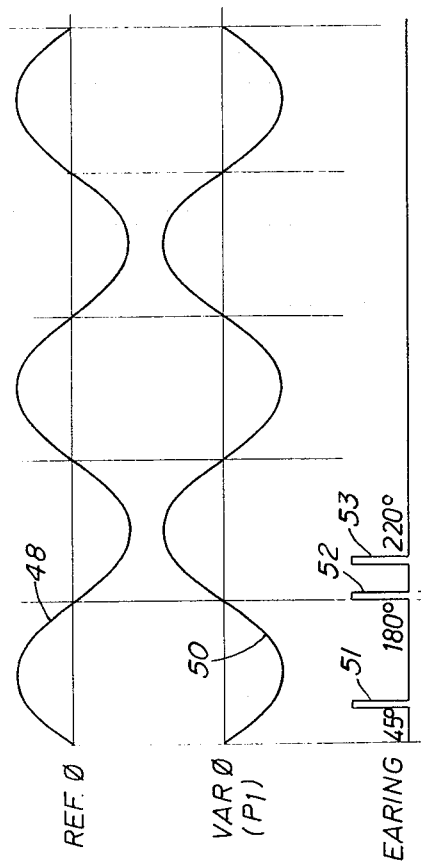
FIG. 3
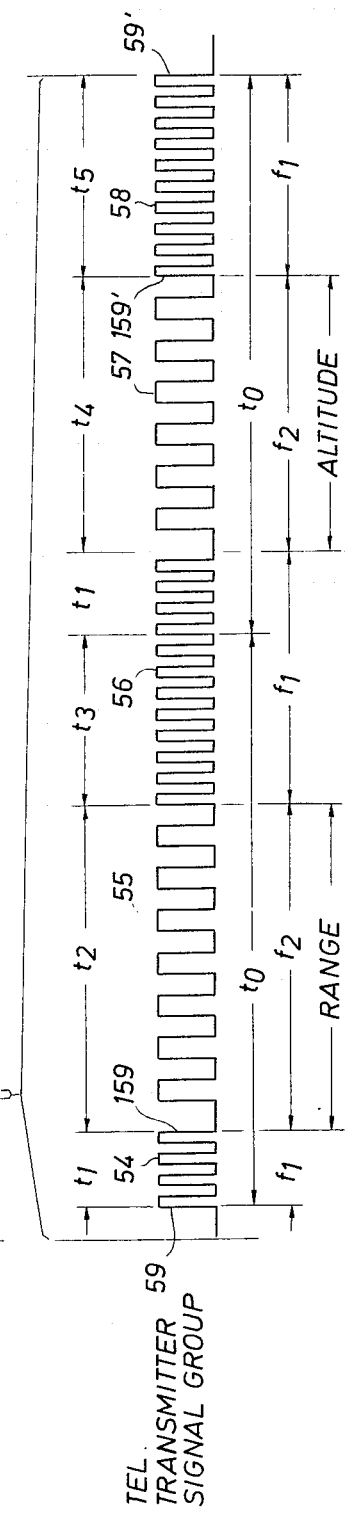
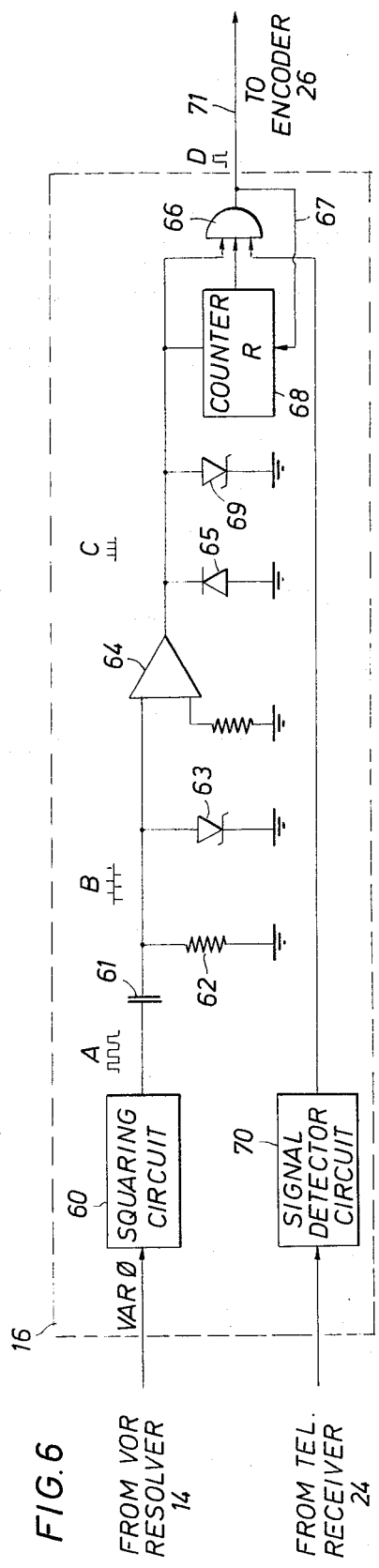
FIG. 6

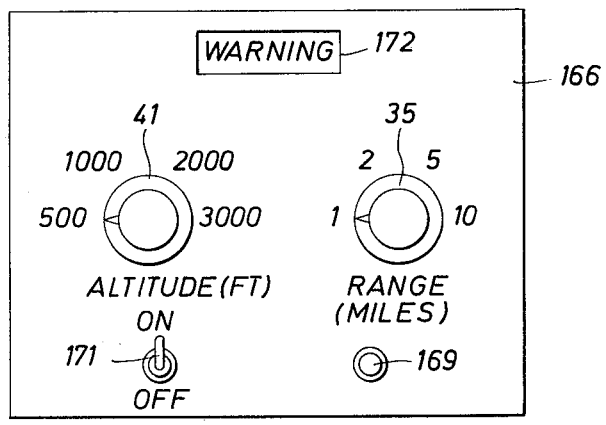

AIRCRAFT COLLISION WARNING SYSTEM

BACKGROUND OF THE INVENTION

This invention relates to the prevention of mid-air collision between aircraft.

With the widespread usage of private and commercial air transportation in recent years the hazards of in-flight collision are greatly increased. Aircraft can receive a collision from many angles out of view of the pilot, and even the most observant pilot is subject to the possibility of a mid-air collision. Another aircraft may be obscured by clouds, fog, or haze when it may be located in a normally observable region. Hence it is desirable to provide a method of and apparatus for aiding pilots by warning them of the approach of intruding aircraft. It is also desirable to provide significant information about the intruding aircraft to aid pilots in making a logical determination of a suitable avoidance maneuver.

The prior art has attempted to solve the problem of mid-air aircraft collisions. The prior art has proposed various methods of and apparatus for detecting the possibility of a mid-air collision so that the pilots of the aircraft can be warned in time to take evasive action. For example, complex radar systems, either mounted on the aircraft or located on the ground, have been proposed and are in use. The major disadvantages of these methods and apparatus is their complexity and less than adequate performance, making their use subject to failure. In addition, their use makes them expensive. It is desirable to provide a method of and apparatus that is low in cost. The method and apparatus should also be sufficiently versatile so that its performance and cost can be varied over a range that allows its use on small inexpensive aircraft as well as large, expensive aircraft depending upon the quality of protection and sophistication desired.

Other proposed prior art systems have utilized a system of orbiting satellites that provide synchronizing signals to aircraft for controlling either a time sharing signal system or a receiving gate technique that is open for a predetermined time period to detect intruding aircraft within preselected defensive zones.

The Air Transport Association has adopted the position that a collision avoidance or collision warning system should utilize time sharing techniques, i.e., the division of an operating cycle into a large number of time slots. Each aircraft in the system is assigned an exclusive time slot in which it may broadcast or transmit position location messages. Each aircraft in the system receives position location messages from other aircraft during all other times.

Several prior art time sharing systems have been proposed. One system utilizes synchronization between aircraft by utilizing ultra-stable atomic clocks to produce time slots for transmission. Even when utilizing atomic clocks, some drift occurs and over a period of time, excessive error would accumulate. Monitoring, checking and re-synchronization would have to be accomplished periodically. Such a system would include precise time synchronization of the atomic clocks located at each airport. Another disadvantage of this system is the cost of installation of the atomic clocks at each airport and the cost and complexity of the airborne equipment needed for the system.

Other time sharing systems utilize time slots which are derived from an ordinary crystal oscillator. Crystal oscillators are much less expensive than atomic clocks but their drift is much greater, thereby necessitating frequent re-synchronization in order to attain a high degree of timing accuracy. Many ground stations would have to be provided and the ground stations synchronized in order to provide adequate service over a large region. Disadvantages are high cost and large size and the necessity for frequent recalibration of the oscillators to eliminate drift over a long period. Further, it is costly to install, operate and maintain the network of necessary ground stations.

Another air traffic control system proposes to use the DME frequency of standard distance measuring equipment utilizing VORTAC, VOR/DME or TACAN ground stations presently in existence and utilized in aircraft navigation. This system would allow an aircraft to transmit on the DME frequency when DME signals are not being transmitted by the ground station. Such transmissions would be random or on a roll call basis as instructed by a ground installation within the region. But the system makes no provision for systematic synchronized transmissions, and if synchronized transmissions are to be made, one of the other synchronization systems, i.e., atomic clock or crystal oscillator, would have to be utilized, and would incorporate their inherent disadvantages.

Accordingly, it is one primary feature of the present invention to provide an aircraft collision warning method and system.

Another primary feature of the present invention is to provide an aircraft position reporting method and system.

Yet another feature of the present invention is to provide an aircraft collision warning method and system that is simple, reliable, low cost and readily adaptable to present aircraft navigation equipment.

Another feature of the present invention is to provide an aircraft collision warning method and system that utilizes time sharing techniques synchronized to the standard VOR navigational signals presently transmitted by fixed ground stations throughout the world.

Still another feature of the present invention is to provide an aircraft collision warning system in which position location messages are transmitted that establish each aircraft's position in polar coordinates relative to the VOR ground station.

Another feature of the present invention is to provide an aircraft collision warning system in which synchronization of the time sharing technique is accomplished by utilization of the phase relationship of the variable phase sinewave component of the VOR signal relative to its reference phase component.

Yet another feature of the present invention is to provide an aircraft collision warning system in which the bearing information of the polar coordinate position location message is transmitted by the time relationship of the start of a position location message and the reference phase sinewave component of the VOR navigation signal.

Another feature of the present invention is to provide a collision warning method and system that warns a pilot of a possible mid-air collision with more than one aircraft at the same time and which provides him with sufficient information upon which he can make an evaluation of the possible collision threat by an intruding aircraft so that he can take appropriate evasive action.

Still another feature of the present invention is to provide a collision warning method and system that is flexible in complexity and cost and suitable for use on a wide range of aircraft.

SUMMARY OF THE INVENTION

In accordance with a principle of this invention, a method of providing an aircraft collision warning is provided. The method comprises the steps of: receiving bearing information signals from a ground VOR/DME station; receiving range information signals from said ground station; receiving altitude signals from an airborne altimeter; resolving said bearing signals into variable phase and reference phase sinewave components; receiving position location messages from other aircraft; controlling the generation of a signal representative of the bearing of the aircraft in response to receiving said variable phase component and position location messages of said other aircraft; encoding said bearing signals, distance information signals and altitude signals as a position location message; transmitting over a preselected frequency said position location message indicating the bearing, range and altitude of the aircraft with respect to said ground station; decoding said position location messages from said other aircraft into bearing, range and altitude information with respect to said ground station; generating signals representative of the bearing and range of said other aircraft with respect to said ground station; generating a signal representative of the altitude of said other aircraft; said received encoded position location messages from said other aircraft being utilized in controlling generation of a signal representative of the bearing of the aircraft only when no position location message is being received; generating a signal representative of the absolute difference in the range signals of said other aircraft and the receiving aircraft; generating a signal representative of the absolute difference in the bearing signals of said other aircraft and the receiving aircraft; generating a signal representative of the absolute difference in the altitude signals of said other aircraft and the receiving aircraft; selecting a range safety differential and generating a signal representative of said selected differential; selecting an altitude safety differential and generating a signal representative of said selected differential; generating a signal representative of a predetermined bearing safety differential related to said selected range safety differential; generating a range comparison signal in response to said range absolute difference and range safety differential signals when said range absolute difference is within said selected range safety differential; generating a bearing comparison signal in response to said bearing absolute differential and bearing safety differential signals when said bearing absolute difference is within said selected bearing safety differential; generating an altitude comparison signal in response to said altitude absolute differential and altitude safety differential signals when said altitude absolute difference is within said selected altitude safety differential; generating a gating signal when said range, bearing and altitude comparison signals occur simultaneously; and visually and audibly warning the receiving aircraft pilot when other aircraft intrudes within said selected range, bearing and altitude safety differentials in response to said gating signal.

In accordance with a further principle of this invention, the method includes the additional steps of: generating signals representative of the coordinate location of said other aircraft with respect to the receiving aircraft in response to receipt of the bearing and range signals of said other aircraft and the bearing and range signals of the receiving aircraft; and visually displaying the location of said other aircraft with respect to the receiving aircraft when said other aircraft is within said selected altitude safety differential.

In accordance with a further principle of this invention, the method includes: visually displaying the location of said other aircraft and said receiving aircraft with respect to said ground station.

In accordance with still another principle of this invention, the initiation of a transmitted position location message in time relation to said VOR signal reference phase sinewave component is a measure of the bearing of the aircraft transmitting said message.

In accordance with a further principle of this invention, an apparatus for providing an aircraft collision warning is disclosed. The apparatus comprises a VOR receiver for receiving bearing information signals from a ground station; a DME receiver for receiving range information signals from said ground station; an altimeter; resolver means connected to said VOR receiver for resolving said bearing signals into variable phase and reference phase sinewave components; a telemetry receiver for receiving position location messages from other aircraft; controller means receiving said variable phase output from said resolver means and said received position location messages from said telemetry receiver for generating an output signal representative of the bearing of the aircraft synchronized in time relation to the transmission of position location messages by said other aircraft; a telemetry transmitter; encoder means connected to said telemetry transmitter and receiving inputs from said DME receiver and altitude transducer and receiving said controller output signal for encoding said bearing, range and altitude information and controlling the operation of said telemetry transmitter for transmitting said encoded information as a position location message reporting the location of the aircraft with respect to said ground station; a decoder means connected to said telemetry receiver for receiving said position location messages of said other aircraft and receiving said reference phase output from said resolver for decoding said position location message and generating signals representative of the bearing and range of said other aircraft with respect to said ground station, and further generating a signal representative of the altitude of said other aircraft; said controller circuit receiving said telemetry receiver output and generating an output signal for application to said encoder means representative of the bearing of said aircraft only when no position location message is being received by said telemetry receiver; difference circuit means receiving said range, bearing and altitude signals of said other aircraft from said decoder means and said range, bearing and altitude signals of the receiving aircraft from said DME receiver, VOR receiver and altimeter for generating a first signal representative of the absolute difference in said ranges of said aircraft, a second signal representative of the absolute difference in said bearings of said aircraft, and a third signal representative of the absolute difference in said altitudes of said aircraft; safety differential means for selecting range, bearing and altitude safety differentials with respect to the receiving aircraft and generating an output signal representative of each; comparing circuit means receiving said first, second and third signals from said difference circuit means and said signals representative of said predetermined range, bearing and altitude safety differentials for generating a fourth signal when said absolute difference in said ranges is within said selected range safety differential, a fifth signal when said absolute difference in said bearing is within said selected bearing safety differential and a sixth signal when said absolute difference in said altitudes is within said selected altitude safety differential; gating means receiving said fourth, fifth and sixth signals from said comparing circuit means for generating an output signal when said signals are received simultaneously; and visual and audio warning means operable in response to said output signal of said gating means to warn the receiving aircraft pilot when said other aircraft intrudes within said selected range, bearing and altitude safety differentials.

In accordance with still a further principle of this invention, the apparatus further includes coordinate computing means receiving the bearing and range signals of said other aircraft from said decoder and receiving the bearing signal of the receiving aircraft from said VOR resolver means and the range signal of the receiving aircraft from said DME receiver for generating output signals representative of the coordinate location of said other aircraft with respect to the receiving aircraft; and display means receiving said coordinate computing means output and the output from said altitude comparing circuit for visually displaying the location of said other aircraft with respect to the receiving aircraft if said other aircraft is within said selected altitude safety differential.

In accordance with yet a further principle of this invention, the apparatus alternately includes visual display means; and circuit means receiving inputs of bearing and range of said other aircraft from said decoder means, bearing and range of the receiving aircraft from said VOR resolver and DME receiver, position location message start and end signals from said decoder means and a controller means output signal for generating signals applicable to said display means for displaying the location of said other aircraft and the receiving aircraft with respect to said ground station.

In accordance with another principle of this invention, the controller means output signal occurs simultaneously with the occurrence of a zero crossing in a positive going direction of said variable phase sinewave component of said VOR signal, the occurrence of said controller signal in time relationship with said reference phase sinewave component being a measure of the bearing of the aircraft receiving said VOR signals.

In accordance with still another principle of this invention, the synchronization of said encoded position location message is dependent on the phase relationship between said variable phase and reference phase sinewave components of said VOR signals.

In accordance with a further principle of this invention, the initiation of a position location message as transmitted by said telemetry transmitter in time relation to said VOR signal reference phase sinewave component is a measure of the bearing of the aircraft transmitting said message.

BRIEF DESCRIPTION OF THE DRAWINGS

In order that the manner in which the above-recited advantages and features of the invention are attained, as well as others which will become apparent, can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings:

FIG. 3 illustrates the method of encoding of position information of an aircraft with relation to the VORTAC bearing signal;

FIG. 6 is a schematic diagram of the controller circuit shown in FIGS. 2 and 4;

FIG. 11 illustrates an aircraft proximity warning indicator;

FIG. 12 is a block diagram of a regional collision avoidance system for use in connection with the circuitry shown in FIG. 4;

DETAILED DESCRIPTION OF THE PREFERRED EMBODIMENTS

The present invention utilizes to a large extent existing airborne and ground facilities to provide a means of transmitting aircraft position information for use in a PWI and CAS system. Most aircraft presently in operation, military, commercial, and private, have equipment for measuring range and bearing from existing ground transmitters such as VORTAC, VOR/DME and TACAN. Many aircraft also have area navigation and course-flying computer equipment, auto pilots, Loran-C and other equipment. In the present invention, equipment is added to the existing onboard equipment so that the aircraft's position can be transmitted to other aircraft and to ground stations. A first embodiment provides that aircraft with a relatively simple system will only transmit information indicative of its altitude, range and bearing location with reference to a VORTAC or VOR/DME station. More sophisticated systems which could be utilized by other aircraft would be capable of receiving such location information and providing a PWI system to warm the aircraft when an intruder is within a preselected safety envelope surrounding the aricraft. Even more sophisticated systems which would be utilized by other users would be capable of receiving information from both of the first two groups of aircraft and displaying it on a suitable CRT display means showing all aircraft within a regional area and their position relative to a VORTAC or VOR/DME station or an area display showing aircraft in an area with respect to a receiving aircraft.

Air traffic controllers on the ground may also monitor positions of the aircraft in the region, thus adding to their radar information of aircraft in the area. This information received by ground control stations could take the range, bearing and altitude of all aircraft in the system and store it at appropriate locations. Such information may be used by local air traffic controllers to control air traffic or the information may be inserted into a national or even international air traffic control system. Of course, under the present air traffic control system, flight plans are filed by aircraft and entered into computer networks. The continuous input of information from aircraft to be equipped as described in the present application will allow the continuous updating of the computer memory so that information is current and thus information supplied by the computer network will be much more accurate and reliable than at the present time.

Figure 1:
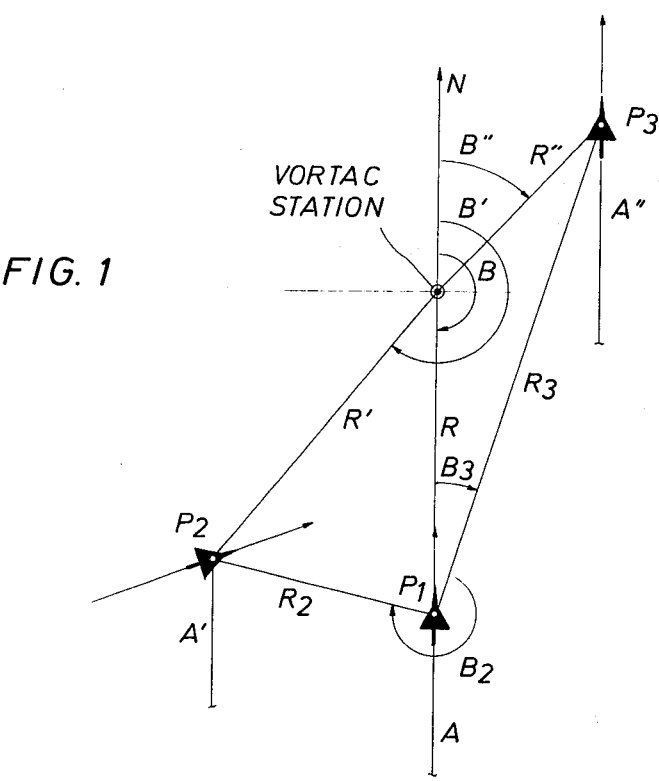
FIG. 1 illustrates three aircraft within reception distance of a ground navigation VORTAC station.

FIG. 1 illustrates three aircraft, $P_1$, $P_2$ and $P_3$, which are equipped with suitable existing equipment for determining bearing and range from a VORTAC or VOR/DME ground station. For example, aircraft $P_1$ has the bearing B and range R from the VORTAC station shown; aircraft $P_2$ has the bearing B' and range R' from the VORTAC station; and aircraft $P_3$ has the bearing B'' and range R'' from the ground station. Aircraft $P_1$ is also shown as having an altitude A while $P_2$ and $P_3$ are shown having altitudes A' and A'', respectively. With respect to aircraft $P_1$, aircraft $P_2$ is located at a bearing $B_2$ and a range $R_2$ and aircraft $P_3$ is located at a bearing $B_3$ and a range $R_3$. The displacement and velocity of an aircraft, its rate of climb or descent, and other characteristics may be determined from its location knowing its bearing, range and altitude with respect to a known point.

Existing ground facilities provide VORTAC or VOR/DME stations for aircraft and transmit bearing and range information to airborne equipment carried by various aircraft. By utilizing the present invention, certain of these VORTAC or VOR/DME stations are designated as control stations so that all aircraft within a designated region would be required to tune their existing range and bearing receiving equipment and the transmitting and receiving equipment of this invention to the frequency at which the control VORTAC or VOR/DME station is operating. In this specification, continued references will be made to a VORTAC station, which will include a VOR/DME station, and will mean a designated control ground station.

Figure 2:
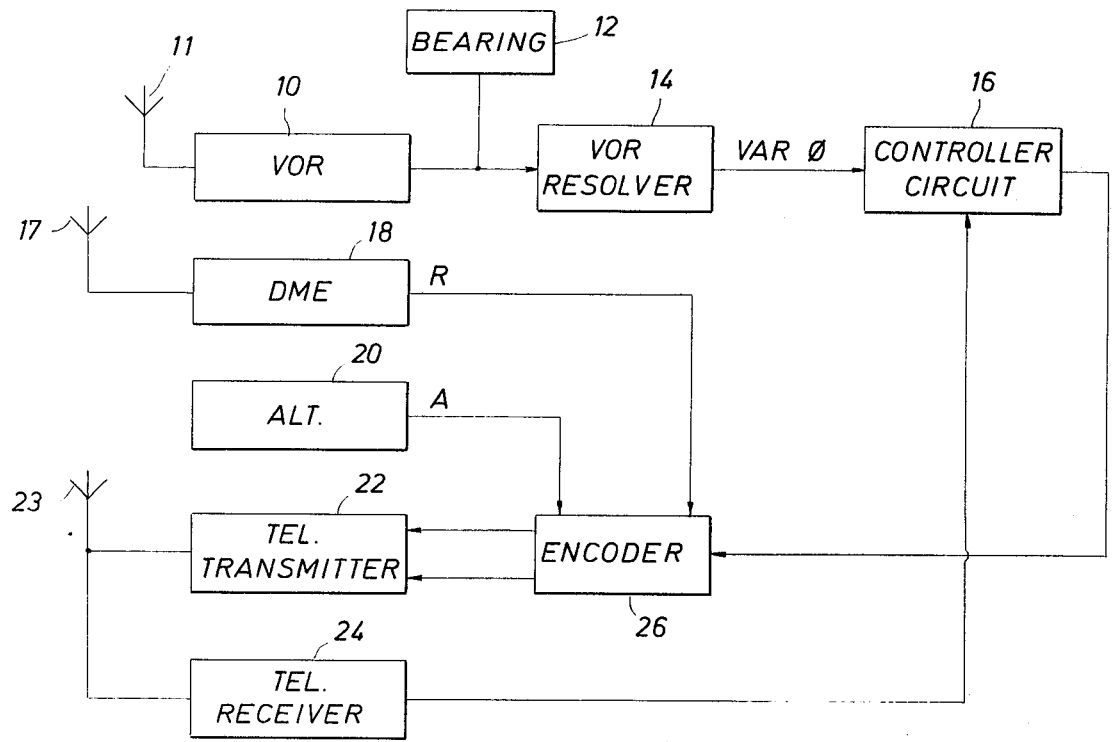
FIG. 2 illustrates airborne equipment for transmitting position information of an aircraft.

FIG. 2 illustrates a simplified transceiver system which may be utilized by an aircraft which only transmits its range, bearing and altitude information. Such a system may be utilized on many existing types of private aircraft. The aircraft has a conventional VOR receiver 10 connected to a suitable receiving antenna 11, and a conventional DME receiver connected to a receiving antenna 17. The VOR receiver 10 is connected to a standard bearing indicator 12 and a VOR resolver 14 which isolates the variable phase and reference phase signals of the transmitted VOR signal, and transmits the variable phase signal to a controller circuit 16. The DME receiver 18 provides a range signal R as an input to an encoder 26. Altimeter 20 of the aircraft provides altitude information A to the encoder 26. Telemetry receiver 24 receives transmitted position location messages via antenna 23 from other aircraft and applies such received signals as a second input to controller circuit 16. The received position location message from another aircraft is utilized by the controller 16 for synchronizing and timing transmissions by transmitter 22 as will hereinafter be explained in greater detail. The controller circuit 16 is connected as a third input to encoder 26 and provides bearing information and controls the operation of encoder 26 for encoding the bearing, altitude and range information as a position location message. The telemetry transmitter 22 transmits at a preselected frequency the encoded signal group indicating bearing, range and altitude information via a suitable transmitting antenna 23. The detailed method of generating the telemetry signal containing the bearing, range and altitude information will be hereinafter described in greater detail.

The VOR information from a VORTAC station consists of two signals, a sinewave signal frequency modulating an r-f carrier, referred to as a reference phase, and an amplitude modulated sinewave signal modulating an r-f carrier, referred to as the variable phase. The phase displacement of the variable phase sinewave with reference to the reference phase sinewave is a measure of the bearing of the aircraft from the VOR station as measured from magnetic north. The time period of a single cycle of the sinewave is 33 milliseconds, and this is the time during which the VOR transmitter sweeps through its complete 360° bearing cycle. In other words, in each millisecond the VOR bearing signal sweeps through an approximate 10.8° bearing angle. Presuming that an aircraft position signal could be transmitted every millisecond, 33 signals could be transmitted during one cycle of the variable phase, but if each transmitter for every aircraft was blanked during 50 succeeding cycles, then 50 aircraft could transmit during the same 1 millisecond time space during 50 succeeding cycles of the variable phase, allowing a total of 1,650 aircraft to transmit position information during a time period of approximately 1.65 seconds. Of course, a blanking interval of any number may be utilized, but 50 is a realistic figure having practical application. The controller 16 in FIG. 2 above functions to determine the zero crossing in a positive going direction of the variable phase sinewave signal and blanks the operation of the encoder 26 for the selected blanking interval by counting the zero crossings since the last position location message transmission. In the case of the invention, this would be for a selected 50 zero crossings, or 50 cycles of the variable phase sinewave.

Referring now to FIG. 3, an example of the reference phase sinewave and a variable phase sinewave as received by an aircraft is shown. The received variable phase sinewave 50 is for an aircraft $P_1$ as shown in FIG. 1. The zero crossing of the variable phase signal 50 occurs at 180° with respect to the reference phase sinewave 48 and, accordingly, the bearing would be 180° with respect to the transmitting VORTAC station as shown by bearing B in FIGS. 1 and 3, at which time a bearing pulse 52 might be generated. Similarly, pulses marking the bearing location of aircrafts $P_2$ and $P_3$, B' and B'', respectively, as shown in FIG. 1, are illustrated by bearing pulses 51 and 53 in FIG. 3. Presuming that the time period of the generation of the bearing pulse is approximately 1 millisecond, as mentioned above, 33 such signals could be transmitted or received during 1 cycle of the variable phase sinewave 50. This is more than adequate time in which to generate an encoded telemetry signal for transmission to other aircraft.

The typical telemetry transmitter position location message signal generated by encoder 26 and telemetry transmitter 22 is illustrated in FIG. 3 with the encoded signal group comprising two distinct frequencies $f_1$ and $f_2$. The first occurrence of $f_1$ frequency 54 has a predetermined time period $t_1$ and would be the starting marker pulse of the encoded signal group. The leading edge 59 of the marker pulse 54 would coincide with a zero crossing in a positive going direction of the variable phase sinewave 50 and thus, when compared to reference phase 48, would indicate the bearing of the sending or transmitting aircraft with respect to the VORTAC station. The second portion of the encoded message indicates range information and comprises a signal of a second frequency, $f_2$, as shown at 55. The duration of the $f_2$ signal 55 is, of course, variable depending on the discrete range information to be transmitted and is equal to $t_2$. The third portion of the signal group comprises a second occurrence of $f_1$ frequency separating the range and altitude information encoded signals and has a time duration equal to $t_3$. But the entire range signal group has a time period $t_0$. Therefore $t_3 = t_0 - t_1 - t_2$, and will have a predetermined minimum interval and a maximum interval dependent on the length of $t_2$, the range signal. Immediately following the first $f_1$ signal during $t_3$ occurs a second $f_1$ signal having a period $t_1$ which is the same predetermined period as that preceding the range information and marks the beginning of the altitude signal group. Next occurs an $f_2$ signal 57 that is variable depending on the discrete altitude information to be transmitted and has a period $t_4$. The fifth portion of the signal group comprises a third occurrence of $f_1$ frequency 58 and marks the end of the transmitted encoded bearing, range and altitude signal group. The fifth $f_1$ portion 58 has a time duration equal to $t_5$ and ends with the trailing edge of the last pulse 59'. Again, the entire altitude signal group has a time period $t_0$, identical to the time period $t_0$ for the range signal group. Accordingly, $t_5 = t_0 - t_1 - t_4$, and will have a predetermined minimum interval and a maximum interval dependent on the length of $t_4$, the altitude signal. It can be seen that $t_0$ and $t_1$ and the predetermined minimum period for $t_3$ and $t_5$ may be chosen at many values, but the following values have been selected for utilization with the invention:

$t_0 = 255\ \mu$ sec.

$t_1 = 4\ \mu$ sec.

$t_3 = 10\ \mu$ sec. (minimum)

$t_5 = 10\ \mu$ sec. (minimum)

$t_2$ and $t_4$ will vary such that $t_0 = t_1 + t_2 + t_3$ and $t_0 = t_1 + t_4 + t_5$.

Figure 4:
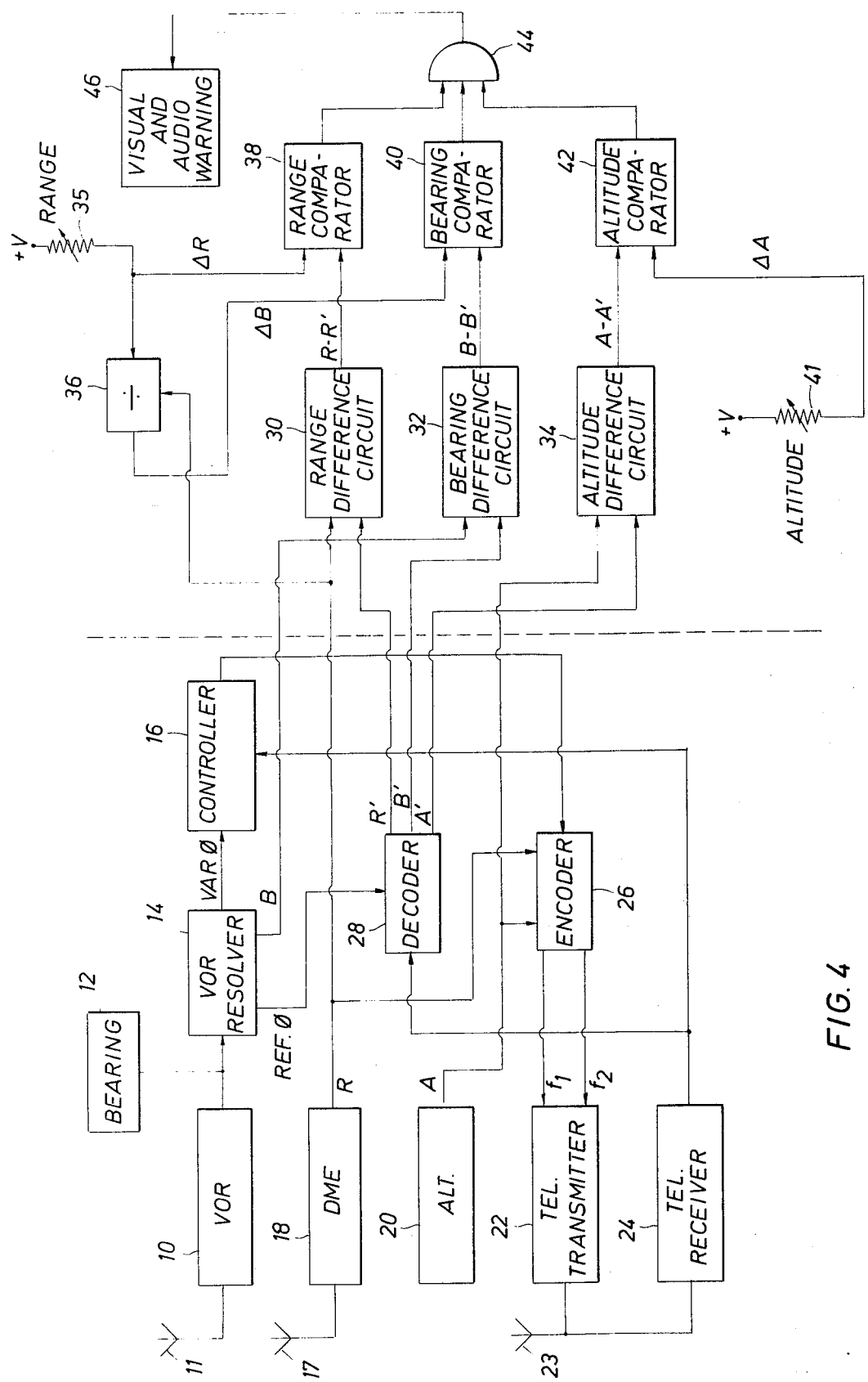
FIG. 4 illustrates airborne equipment of an aircraft for transmitting and receiving position information and providing for proximity warning.

Referring now to FIG. 4, airborne equipment for transmitting and receiving position information and providing for proximity warning of an intruding aircraft is shown. The equipment can be broken down into basically two parts, a transceiver section and a PWI section. A transmitting aircraft may carry as basic equipment the simple transceiver equipment shown in FIG. 2, or it may carry a more sophisticated transceiver as shown in FIG. 4, both utilized for transmitting its location information only or, if it is equipped with the PWI section, for transmitting its location and receiving the bearing, range and altitude information of other transmitting aircraft for appropriate warning of the receiving aircraft pilot when another aircraft intrudes into the preselected safety envelope surrounding the aircraft.

The transceiver shown in FIG. 4 incorporates the basic elements of the transceiver system shown in FIG. 2 and includes a conventional VOR receiver 10 connected to a suitable receiving antenna 11 and a conventional DME receiver 18 having a conventional receiving antenna 17. The VOR receiver transmits bearing information to a conventional bearing indicator 12 and to a VOR resolver 14. VOR resolver 14 generates the variable phase and reference phase sinewaves of the VOR signal and applies the variable phase signal to controller circuit 16 and the reference phase signal to a decoder circuit 28. The bearing signal B of the transmitting aircraft is also applied by the VOR signal generator 14 to a bearing difference circuit 32 of the PWI. The DME receiver 18 applies the range signal R of the receiving aircraft as one input to an encoder 26 and as an input to a range difference circuit 30 in the PWI. Altimeter 20 applies an altitude signal A of the receiving aircraft as a second input to encoder 26 and as an input to altitude difference circuit 34 of the PWI. A telemetry transmitter 22 and receiver 24 are connected to a suitable receiving and transmitting antenna 23. Telemetry receiver 24 receives telemetry signals from other transmitting aircraft and applies them as an input to decoder 28 and also as an input to controller circuit 16. The output of controller circuit 16 is applied to encoder 26 for controlling the operation of the encoder which, in turn, provides input signals to the telemetry transmitter for controlling the generation and transmission of $f_1$ and $f_2$ signals comprising the encoded location information message.

Decoder 28 provides an altitude signal A' of a transmitting intruder aircraft as a second input to altitude difference circuit 34. Similarly, decoder 28 provides bearing information B' and range information R' of a transmitting intruder aircraft as a second input to bearing and range difference circuits 32 and 30, respectively. The difference circuits 30, 32 and 34 subtract R', B' and A' from the R, B and A of the receiving aircraft. The output of range difference circuit 30 is applied as an input to range comparator 38, which receives a second input indicative of a preselected safety envelope range interval of $\Delta R$ which is preset by a range potentiometer 35. A predetermined bearing differential based upon the preselected $\Delta R$ is received from a dividing circuit 36 which receives the $\Delta R$ information from the range potentiometer 35. Similarly, an altitude control 41 is utilized to preset a differential altitude utilized in the safety envelope preselected and is applied as an input $\Delta A$ to altitude comparator 42. The comparator circuits 38, 40 and 42 comprise the differences between $B-B'$, $R-R'$ and $A-A'$ with the safety envelope parameters selected, i.e., $\Delta B$, $\Delta R$ and $\Delta A$. The output of each of the range, bearing and altitude comparators, 38, 40 and 42, respectively, is applied as an input to AND gate 44. The output of AND gate 44 is applied to a visual and audio warning means 46 for indicating to the pilot of the receiving aircraft that another transmitting aircraft is intruding into the preselected safety envelope surrounding his aircraft.

A typical instrument panel installation 166 of the PWI system described above can be seen in FIG. 11. Device 166 shows range control 35 marked in miles and can be preset for the $\Delta R$ selected. The altitude control is marked in feet and can be preset to the $\Delta A$ selected for the safety envelope. An ON-OFF switch 171 and operating lamp 169 are provided. A warning light 172 is provided that will be switched on when a transmitting aircraft intrudes within the safety envelope of the aircraft. An audible buzzer or bell (not shown) could be provided within device 166 to alert the pilot that another transmitting aircraft has entered his safety envelope.

Figure 5A:
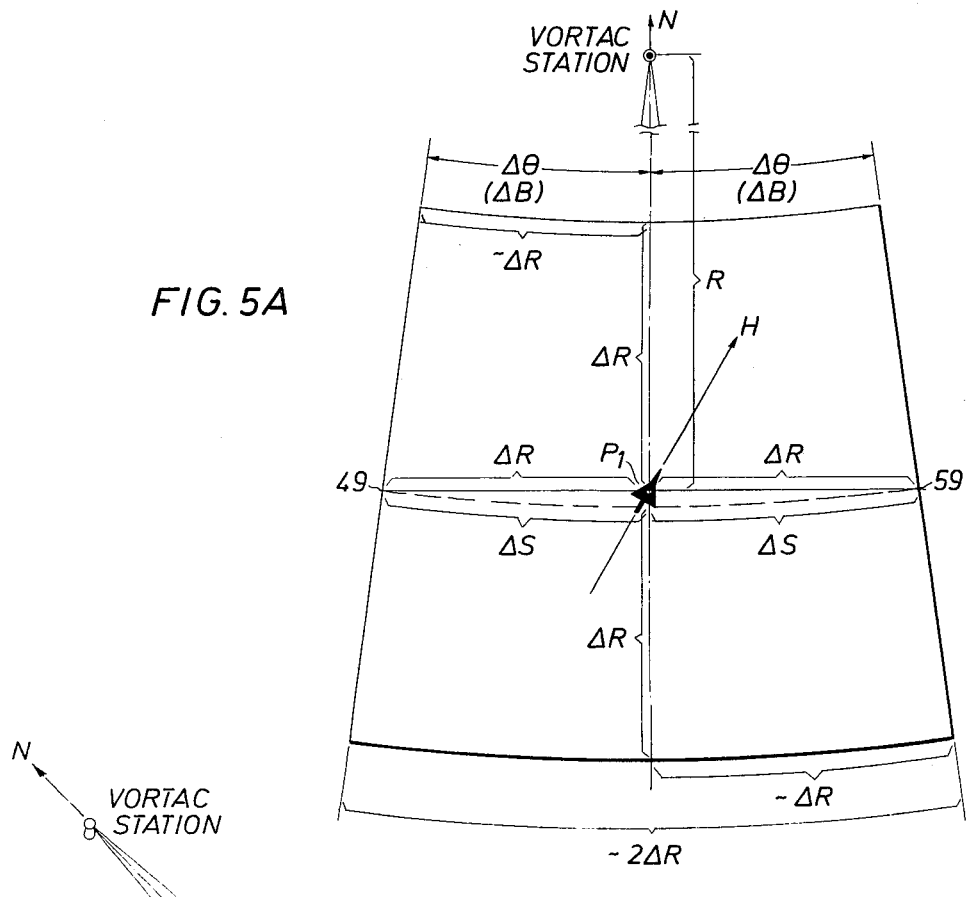
FIGS. 5A and 5B illustrate a typical collision avoidance system envelope surrounding an aircraft as provided by this invention.
Figure 5B:
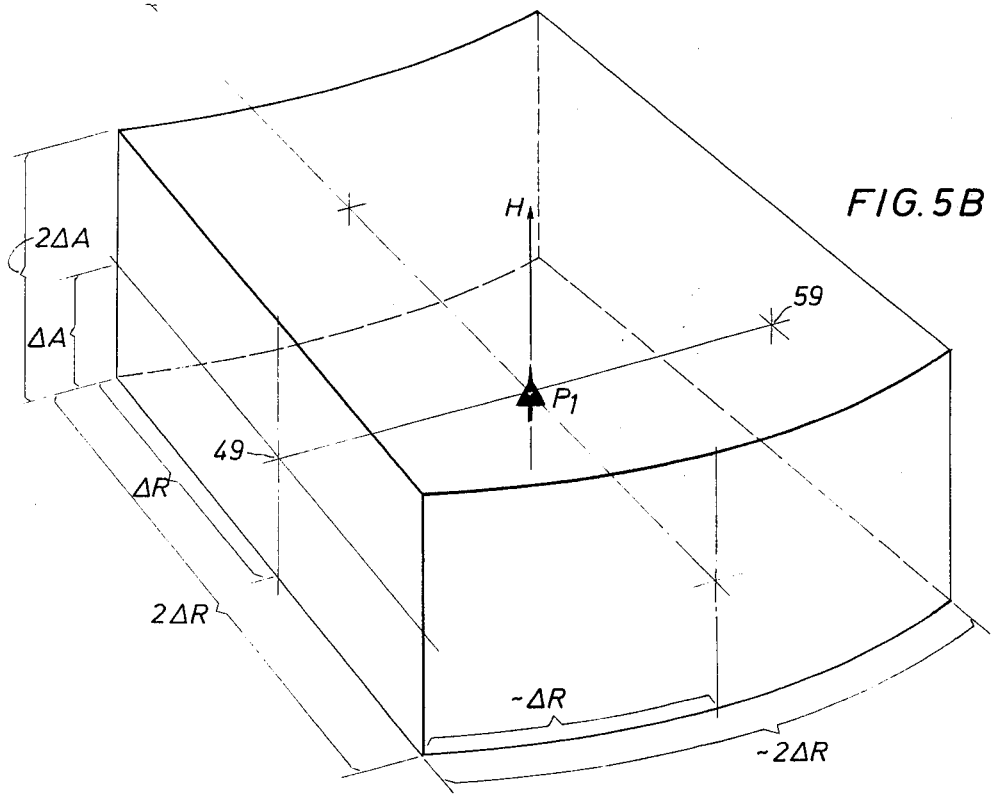

FIGS. 5A and 5B illustrate a typical collision avoidance system (CAS) safety envelope surrounding an aircraft and which may be preselected by means of selecting $\Delta R$ and $\Delta A$ by presetting range and altitude controls 35 and 41 shown in the PWI of FIG. 4. FIGS. 5A and 5B show an aircraft $P_1$ flying on a heading H. By setting range control 35, a $\Delta R$ is selected to either side of the aircraft along a radial line passing through the aircraft and the control VORTAC station. As shown in FIGS. 4, $\Delta B$ is determined as a function of $\Delta R$ and will be hereinafter explained. If a line is drawn through aircraft $P_1$ perpendicular to the radial line from the VORTAC station through aircraft $P_1$ and a distance equal to $\Delta R$ is marked off along the perpendicular line to either side of aircraft $P_1$, a bearing $\Delta \theta$ will then be established between aircraft $P_1$ and the outer limits of the $\Delta R$ distance measured to both sides of the aircraft. The chordal segment $\Delta S$ from $P_1$ to point 59 or from $P_1$ to point 49 is shown as follows:

$$\Delta S = R \Delta \theta$$

where:

$R$ = range from the VORTAC station to aircraft $P_1$, and $\Delta \theta$ is the bearing differential of the safety envelope.

Accordingly, $\Delta \theta$ (or $\Delta B$) may be determined as follows:

$$\Delta \theta = \Delta S/R$$

but where $R$ is large in comparison to $\Delta R$, then $\Delta S$ is approximately equal to $\Delta R$;

therefore, $$\Delta \theta = \Delta R/R \text{ and } \Delta B = \Delta R/R$$

$\Delta B$ is determined in FIG. 4 by dividing $\Delta R$ by $R$ in dividing circuit 36 which applies the $\Delta B$ signal to the bearing comparator 40. The horizontal dimensions of the safety envelope surrounding aircraft $P_1$ can thus be seen to be a box as shown in FIGS. 5A and 5B having the dimensions 2 $\Delta R$ in length, approximately 2 $\Delta R$ in width, and 2 $\Delta A$ in altitude with aircraft $P_1$ at the center of the box or safety envelope. With the intervals $\Delta A$ and $\Delta R$ selectable by setting of range and altitude controls 35 and 41 shown in FIG. 4, selecting $\Delta R$ thus preselects the $\Delta B$ to be utilized.

FIG. 6 is a block diagram of the controller circuit 16 shown in FIGS. 2 and 4. A squaring circuit 60 is shown receiving the variable phase signal from VOR signal generator 14 where the variable phase sinewave is squared and applied out of the squaring circuit 60 as shown by the waveform diagram at A. The squared sinewave is applied to a differentiating network comprising capacitor 61 and resistor 62 to differentiate the squarewave signal as shown at waveform B. A Zener diode 63 acts as a voltage regulator to control the voltage of the differentiated pulses as they are applied to one input of a differential amplifier 64. Amplifier 64 is a differential amplifier circuit having one input connected to ground potential and a second input receiving the differential waveform shown at B. Differential amplifier 64 functions without its customary feedback resistive network and when coupled with diode 65 provides a pulse waveform output as shown at C, each pulse indicating the zero crossing in a positive going direction of the variable phase sinewave. Zener diode 69 again acts as a voltage regulator to regulate the pulses shown in waveform C to a desired input voltage for application to the succeeding logic circuitry. The pulses shown at C are then applied as one input to AND gate 66. The pulses are also applied as an input to a counter 68 which counts the incoming pulses and upon counting the fiftieth pulse applies an output from the counter as a second input to AND gate 66. The logic circuitry of this invention assumes a positive logic, i.e., logic 1 is a positive level and logic 0 is a negative level.

Simultaneously, a received signal from the telemetry receiver 24 is applied to a signal detector circuit 70 where any incoming received signal is detected. If there is an incoming telemetry signal detected by detector 70, a logic 0 voltage is applied to AND gate 66, thereby disabling the gate. But when no received telemetry signals are detected, detector 70 applies a logic 1 level to AND gate 66, arming the gate. When logic 1 signals are present at all three of the inputs to AND gate 66, the gate passes a logic 1 signal applied via conductor 71 as an input to encoder 26. The duration of the pulse generated by AND gate 66 (shown as waveform D) is relatively short since as soon as AND gate 66 conducts, the output logic 1 is applied back through conductor 67 to reset counter 68 and begin another counting cycle of 50 counts, but simultaneously AND gate 66 is disabled. It may be seen that a pulse output from the controller 16 will be generated only when the following three conditions have been met:

1. a zero crossing in the positive direction of the variable phase waveform has occurred;
2. the counter has counted 50 such zero crossings; and
3. there is no signal being received by the telemetry receiver 24.

The output pulse from controller 16 will be seen to convey the bearing information of the receiving aircraft since it occurs at a zero crossing in a positive going direction of the variable phase waveform received by the receiving aircraft from the VORTAC station, and will indicate to encoder 26 (see FIG. 4) that 50 cycles of the variable phase have been blanked and that it is now time to transmit a receiving aircraft location signal group by the telemetry transmitter 22 (see FIGS. 3 and 4).

Figure 7:
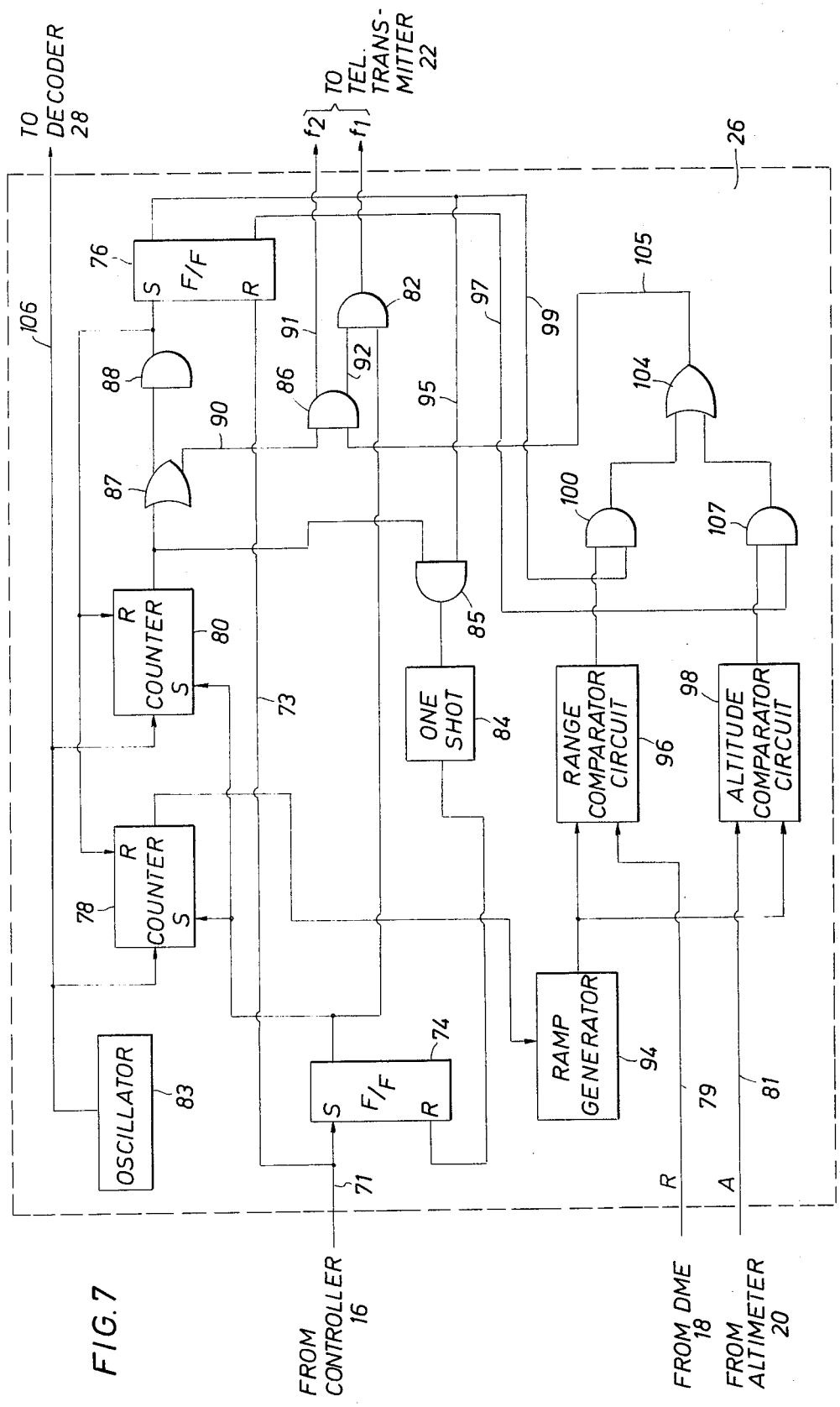
FIG. 7 is a block diagram of the encoder circuit shown in FIGS. 2 and 4.
Figure 8:
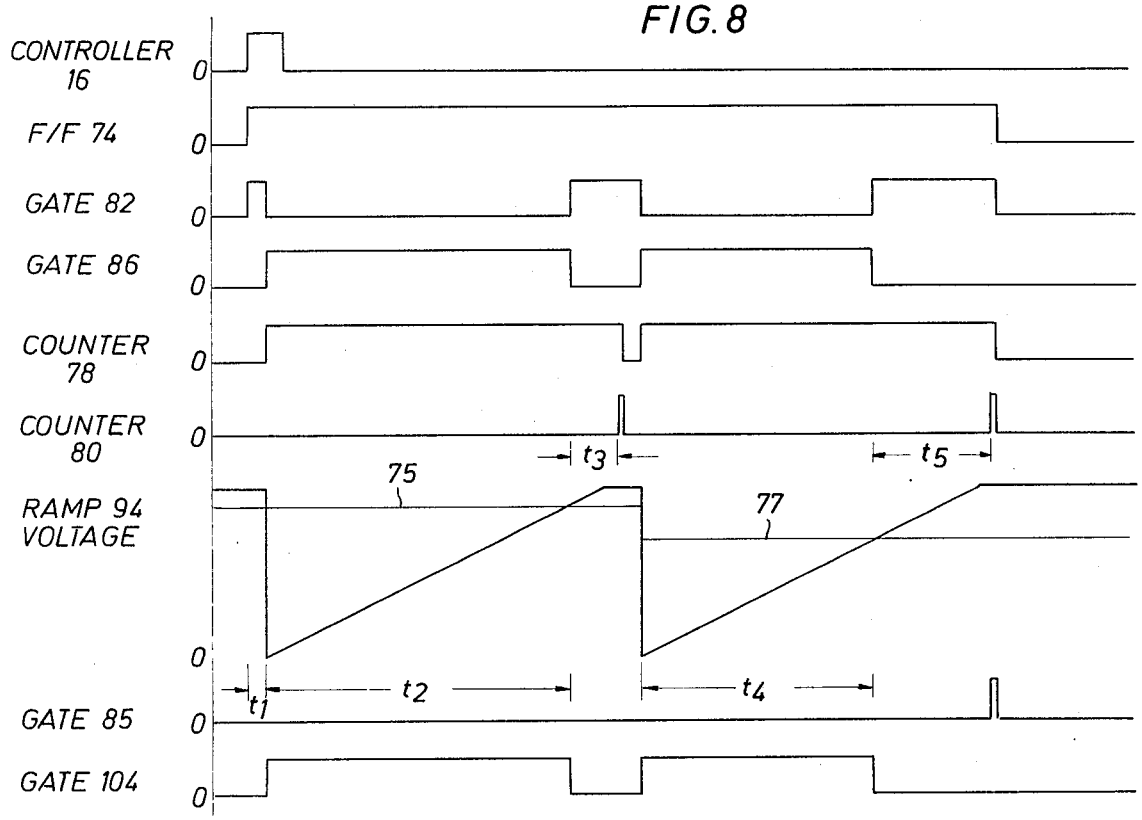
FIG. 8 is a pulse timing diagram showing the relationship between the output pulses of several components of the encoder circuit shown in FIG. 7.

Referring now to FIGS. 7 and 8, the operation of the encoder circuit 26 shown in FIGS. 2 and 4 will be described. The input logic 1 pulse from controller circuit 16 is applied via conductor 71 to the "Set" (S) input of flip-flop 74. The output of flip-flop 74 is a logic 1 applied to the S input of first and second counters, 78 and 80, respectively. The logic 1 output of flip-flop 74 is also applied as one input to AND gate 82, thus enabling the gate. The control pulse from controller 16 is also applied through conductor 73 to the "Reset" (R) input of flip-flop 76. With a logic 1 pulse applied to the R input of flip-flop 76, the flip-flop applies a logic 1 pulse through conductor 97 as one input to AND gate 100, thus enabling the gate. The other output of the flip-flop is a logic 0 and is applied through conductor 99 as one input to gate 102, thus disabling the gate.

An oscillator 83 applies its output to counters 78 and 80, and provides an input for clock pulses to decoder 28 through conductor 106. Oscillator 83 is conveniently a 1 megahertz oscillator in order that counts made by counters 78 and 80 will be counted in microseconds. As soon as the first and second counters 78 and 80, respectively, receive the logic 1 input from flip-flop 74 via their S inputs, both counters begin to count the pulses from oscillator 83. The output of counters 78 and 80 is normally at a logic 0 level until the counters have reached their counting limit, at which time a logic 1 output is generated and applied, in the case of counter 78, to ramp generator 94 and, in the case of counter 80, as the input to OR gate 87 and one input to AND gate 85. Counter 78 counts to four and generates a logic 1 output which is applied to ramp generator 94. The output voltage of ramp generator 94 is normally at its maximum value until such a logic 1 input is received from counter 78 when it drops to zero. With the ramp generator 94 output applied to range and altitude comparator circuits 96 and 98 at its highest level, it will always exceed the range signal R or the altitude signal A received from DME receiver 18 and altimeter 20 applied through conductors 79 and 81. Comparator circuits 96 and 98 compare the valve of the output of ramp generator 94 against the received range R and altitude A signals, respectively, and produce a logic 1 output when the ramp voltage is less than the R or A signal from DME 18 or altimeter 20. At all other times, the output of circuits 96 and 98 will be at a logic 0. Therefore, prior to receipt of a logic 1 pulse from counter 78, the output of ramp generator 94 will be high and the output of comparator circuit 96 will be a logic 0 as applied to enabled AND gate 100. The output of AND gate 100 is a logic 0 and is applied as an input to OR gate 104. The high output of the ramp generator 94 is also applied as an input to altitude comparator circuit 98, the output of which will be a logic 0 applied as a second input to disabled AND gate 102. The output of AND gate 102 is a logic 0 applied to OR gate 104. With logic 0 inputs applied from AND gates 100 and 102, the output of OR gate 104 will be a logic 0 applied through conductor 105 as one input to AND gate 86. The logic 0 input applied through conductor 105 to AND gate 86 causes a logic 1 to be applied through conductor 92 as a second input to AND gate 82. The output from AND gate 82 will be a logic 1 applied to telemetry transmitter 22 for causing the $f_1$ frequency to be generated and transmitted (see FIGS. 3 and 8).

As soon as counter 78 has counted four pulses from oscillator 83, a logic 1 output is generated and applied to the R input of ramp generator 94. The ramp voltage of ramp generator 94 is driven to zero and begins to rise at a constant rate and is applied to the range comparator 96 and altitude comparator 98. When the ramp voltage is driven to zero, the output of range comparator 96 changes to a logic 1 which is in turn applied as an input to enabled AND gate 100 whose logic 1 output is applied to OR gate 104. Similarly, the output of altitude comparator circuit 98 changes to a logic 1 applied to disabled AND gate 102, which applies to a logic 0 as a second input to gate 104. With a logic 1 input to OR gate 104, a logic 1 is applied via conductor 105 to one input of AND gate 86, thereby driving the output of gate 86, through conductor 92, to a logic 0 and switching the $f_1$ output of AND gate 82 from logic 1 to a logic 0, thereby shutting off the $f_1$ frequency after 4 microseconds and forming the initial $f_1$ marker signal 54 as shown in FIG. 3. Simultaneously with the application of a logic 1 input to AND gate 86 through conductor 105 from OR gate 104, the output of AND gate 86 switches to a logic 1 applied through conductor 91 as the $f_2$ input to telemetry transmitter 22. The $f_2$ signal for range is switched on for a time period $t_2$ shown in FIG. 3. As soon as the ramp voltage reaches the voltage level of the range signal R from DME 18, as shown as level 75 in FIG. 8, the output of range comparator 96 goes to a logic 0 which is applied as an input to AND gate 100. Disabled AND gate 100 applies a logic 0 to one input of OR gate 104 which is also receiving a logic 0 input from AND gate 102. The logic 0 applied through conductor 105 to one input of AND gate 86 disables AND gate 86 which applies a logic 1 output through conductor 92 to the second input of AND gate 82. AND gate 82 then applies a logic 1 output to telemetry transmitter 22 for generating $f_1$ voltage during time $t_3$ as shown in FIG. 3. The output of the ramp generator 94 continues to rise until it reaches its maximum level and it remains at that maximum voltage level until the ramp is reset by another pulse from counter 78. It can be seen that the time period $t_2$ shown in FIG. 3 corresponds to the time period between the time when the ramp generator is reset to zero and the time at which the ramp voltage reaches and equals the comparison range signal R received from DME 18.

While all of the foregoing action has been taking place, counter 80 has continued to count pulses from oscillator 83 and when counter 80 counts 255 pulses, i.e., 255 microseconds, counter 80 applies a logic 1 output to the input of OR gate 87 which in turn applies a logic 1 output to the input of AND gate 88 which applies a logic 1 input to the S input of flip-flop 76. Upon being "set" the output of flip-flop 76 changes state and the output applied through conductor 99 as one input to AND gate 102 changes to a logic 1 while the output applied through conductor 97 as one input to AND gate 100 changes to a logic 0. Simultaneously, with the enabling of AND gate 88, a logic 1 input is applied to the R inputs of counters 78 and 80 to reset the counters. Since both counters still have a logic 1 applied to their S inputs as the output from flip-flop 74, the counters immediately upon reset begin to count again through another counting cycle. As mentioned above, AND gate 82 is enabled and a logic 1 output is applied through the $f_1$ lead to transmitter 22 to generate $f_1$ during the $t_3$ time period. When counter 80 counts to 255 microseconds, the first $t_0$ period (see FIG. 3) ends and the second $t_0$ period begins with the continued generation of $f_1$ during $t_1$, just prior to the encoding of the altitude signal. When counter 80 generates a logic 1 output, the output of OR gate 87 applied via conductor 90 will be a logic 0 which disables AND gate 86 and insures that no $f_2$ signal will be generated. Meanwhile, the output of OR gate 104 remains at logic 0 and AND gate 82 remains enabled producing a logic 1 output applied to the $f_1$ circuit of transmitter 22 to continue generation of $f_1$ during the second occurrence of time period $t_1$ as shown in FIG. 3. The first counter counts to four and generates a logic 1 output which is applied to the R input of ramp generator 94, thus resetting the ramp to zero voltage as shown in FIG. 8. Upon the ramp voltage dropping to zero, the output of the altitude comparator circuit is a logic 1 applied as a second input to AND gate 102, the output of which is a logic 1 applied to OR gate 104. The output of the range comparator is a logic 1 as applied to disabled AND gate 100 which in turn applies a logic 0 to OR gate 104. The output of OR gate 104 is a logic 1 applied through conductor 105 to one input of AND gate 86, thereby applying a logic 0 input through conductor 92 for disabling AND gate 82 while a logic 1 appears at the output of AND gate 86 applied through conductor 91 to telemetry transmitter 22 to generate $f_2$ during the altitude information portion of the encoded message as shown in FIG. 3. AND gate 86 was enabled when counter 80 was reset, thereby applying a logic 1 as an input to OR gate 87. A logic 1 output of OR gate 87 is applied through conductor 90 to one input of AND gate 86.

As the ramp voltage generated by ramp generator 94 continues to rise at its linear rate, it will approach the altitude signal voltage A applied from altimeter 20 through conductor 81 to one input of altitude comparator circuit 48, this voltage level in the comparator being shown at level 77 in FIG. 8. When the ramp voltage equals the altitude comparison voltage 77, the output of altitude comparator circuit 98 switches to logic 0 which disables AND gate 102, and applies a logic 0 to OR gate 104. With a logic 0 applied to OR gate 104 from AND gate 100, gate 104 applies a logic 0 output through conductor 105 to AND gate 86 thereby disabling AND gate 86 and applying a logic 0 via conductor 91 causing $f_2$ to stop. The logic 0 applied via conductor 105 to AND gate 86 causes a logic 1 output to be applied through conductor 92 to the second input of AND gate 82, thus causing a logic 1 output to be applied from AND gate 82 to the telemetry transmitter 22 to again start the generation of $f_1$ voltage during the time interval $t_5$. The ramp voltage continues to rise until it reaches its maximum level and then remains at that level awaiting to be reset by the first counter 78.

The second counter 80 has again been counting to 255 microseconds, and when it reaches the 255 count, it generates a logic 1 output applied as an input to OR gate 86 and as one input to AND gate 85. When flip-flop 76 had been reset by the action of counter 80 the first time, a logic 1 output was applied to the second input of AND gate 85 through conductors 99 and 95, and thus when the logic 1 input is applied from the output of counter 80 to enabled AND gate 85, a logic 1 output is applied as an input to one shot 84, thus triggering the one-shot and applying a logic 1 pulse to the R input of flip-flop 74. Upon the reset of flip-flop 74, a logic 0 is applied to the S inputs of the first and second counters 78 and 80, respectively, thus disabling the counters. At the same time that the logic 1 output from counter 80 is applied to AND gate 85, a logic 1 output is applied to the input of OR gate 87, which in turn passes a logic 1 input to AND gate 88, which in turn applies a logic 1 input to the S input of flip-flop 76, which does not cause the flip-flop outputs to change state. The output of AND gate 88 is also applied back to the R inputs of the first and second counters, 78 and 80, respectively, to reset the counters. The output of flip-flop 76 remains with a logic 0 output applied via conductor 97 as one input to AND gate 100 and a logic 1 applied through conductor 99 to one input of AND gate 102, until the next control pulse is received from controller 16 and flip-flop 76 is reset. At the same time that flip-flop 74 changes state upon being reset by one-shot 84, the logic 0 output of flip-flop 74 is also applied as one input to AND gate 82, thus disabling AND gate 82 and applying a logic 0 to the $f_1$ line of telemetry transmitter 22 and ending the final time period $t_5$ as shown at 59' (see FIG. 3). Encoder 26 is now back in its original state awaiting a new control pulse from controller 16 to actuate flip-flop 74 and begin the message encoding process over again.

Referring to FIGS. 3, 7 and 8, it will be noted that the time period of counter 80 is always greater than the time period for the ramp generator to raise its voltage from zero to its maximum value and thereby the ramp voltage of generator 94 will always reach its maximum peak voltage at some time prior to the completion of the message time period $t_0$ (see FIG. 3) as counted by counter 80. It will be seen from the above description that the time period $t_1$ shown in FIG. 3 will always be a constant value dependent on the count of counter 78, which is four microseconds. Time period $t_2$ will vary depending on the length of time elapsing between the time that the ramp voltage drops to zero and the time that the ramp voltage reaches the range comparison level voltage 75. Time $t_3$ will be variable and will be measured by the time elapsing between the time that the ramp voltage reaches level 75 and the time when counter 80 counts to 255. The second occurrence of $t_1$ will again be measured by the count of counter 78, i.e., 4 microseconds. Time period $t_4$ will vary depending on the length of time elapsing between the time that the ramp voltage drops to zero and the time that the ramp voltage reaches the altitude comparison level voltage 77. Time $t_5$ will also be variable and will be measured by the time elapsing between the time that the ramp voltage reaches level 77 and the time when counter 80 counts to 255. If it is desired that $t_3$ and $t_5$ have a minimum time period of 10 microseconds, then it can be seen that the slope of the voltage ramp generated by ramp generator 94 must be adjusted to cause the ramp to reach the highest level comparison voltage during a time period not to exceed 241 microseconds which then determines the maximum length of $t_2$ or $t_4$.

Figure 10A:
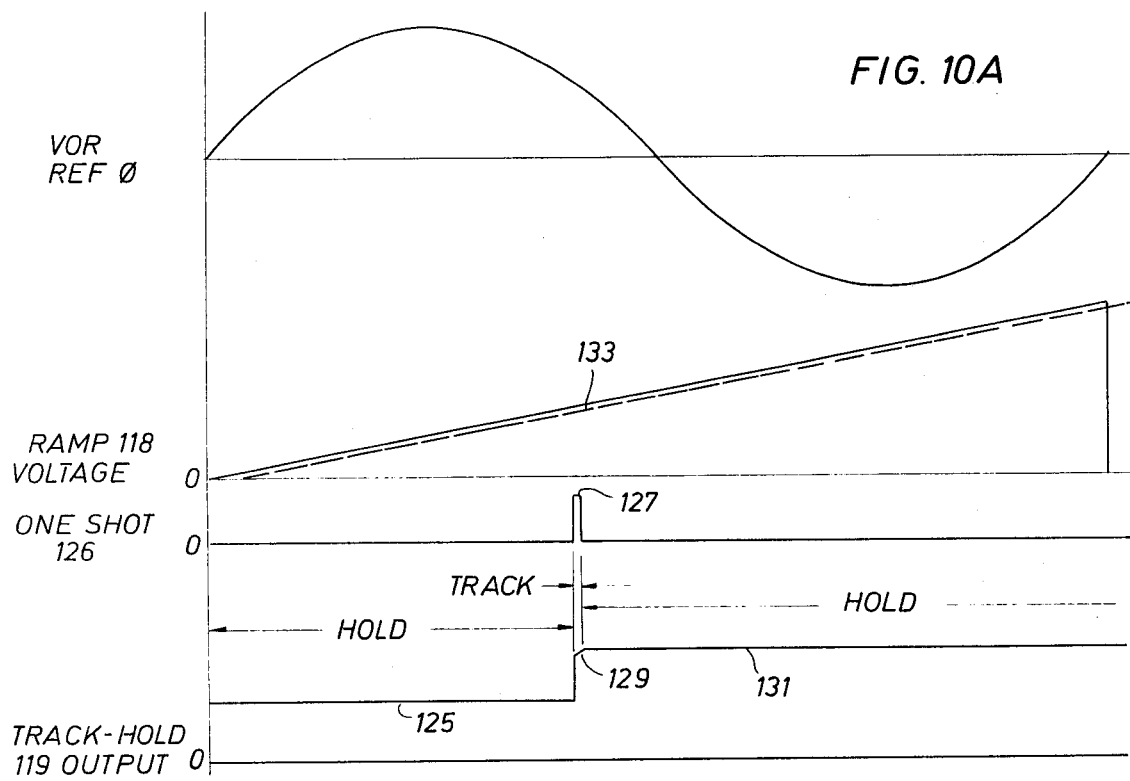
FIGS. 10A and 10B are pulse timing diagrams showing the relationship between the output pulses of several components of the decoder circuit shown in FIG. 9.
Figure 9:
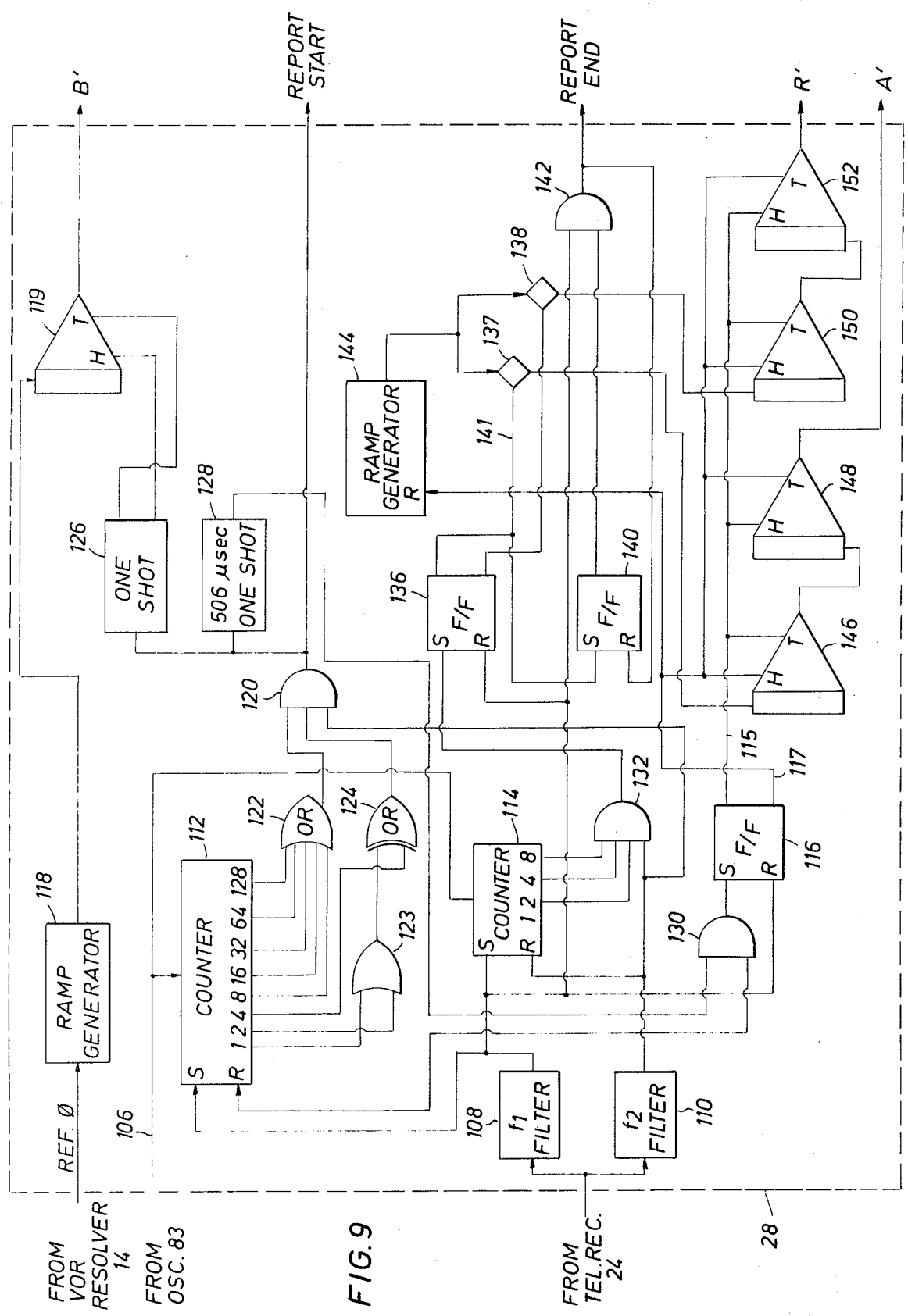
FIG. 9 is a block diagram of the decoder circuit shown in FIGS. 3 and 4.

Referring now to FIGS. 3, 4, 9, 10A and 10B, a detailed description of the decoder circuit 28 will be given. The reference phase sinewave is received from VOR signal generator 14 and applied to a ramp generator 118 whose output is a ramp voltage signal synchronized to one cycle of the reference phase sinewave as shown in FIG. 10A. The synchronized output of the ramp generator is applied as an input to track-hold circuit 119, which is generally in the "Hold" mode since a logic 1 is applied to the Hold (H) input of circuit 119 by one-shot 126. When one-shot 126 is triggered, as will be hereinafter explained, a logic 1 input is applied to the "Track"(T) input and the track-hold circuit 119 will track the synchronized ramp generator voltage during the time interval of the one-shot output. One megahertz clock pulses are received from oscillator 83 from encoder circuit 26 through conductor 106 and applied as inputs to first and second counters 112 and 114, respectively. The received telemetry signal is applied from telemetry receiver 24 as inputs to $f_1$ and $f_2$ filter/detector circuits, 108 and 110, respectively. When $f_1$ frequency is detected by circuit 108, a logic 1 output is applied to the S inputs of counters 112 and 114 to start counter action. In addition, the logic 1 output from filter/detector 108 is applied to the R input of flip-flop 116 and is applied as one input to enable AND gate 142.

The first counter 112 is an eight-bit counter with outputs from each bit as the counter progresses through its counting cycle. At the count of "one", OR gate 123 produces a logic 1 output which is applied as an input to exclusive OR gate 124 which produces a logic 1 output which is applied as an input to AND gate 120. As will be noted, outputs from the fourth through eighth bits of the counter are all connected as inputs to an OR gate 122 whose output will always be the negative of or the opposite logic of its input. Accordingly, at the count of "one", the input to OR gate 122 is zero from the fourth through eighth bits and the output applied from OR gate 122 as an input to AND gate 120 is a logic 1, thereby enabling AND gate 120. As the counts of "two", "three" and "four", the outputs of OR gate 122 and exclusive OR gate 124 remain a logic 1, thereby enabling AND gate 120. However, it can be seen that when the fifth pulse is counted, a logic 1 is applied as an input to OR gate 123 which produces a logic 1 output applied to exclusive OR gate 124. A logic 1 is also applied from the third bit output as a second input to exclusive OR gate 124, which because of its characteristics will provide a logic 0 output when both inputs are at a logic 1. Accordingly, the output from exclusive OR gate 124 applied as an input to AND gate 120 will be a logic 0, thereby disabling AND gate 120 at count "five." As may be readily seen, the same action occurs during counts "six" and "seven." At count "eight" and all counts above eight, a logic 1 input will be applied to OR gate 122, whose output will be a logic 0 applied to AND gate 120, thereby disabling AND gate 120. Accordingly, it can be seen that AND gate 120 will be enabled only during the first four counts of counter 112, and that for counts "five" to 255 AND gate 120 will be disabled.

If the signal applied above is the first $f_1$ frequency received during time $t_1$ as shown at 54 in FIG. 3, an $f_2$ frequency signal will begin between the fourth and fifth counts of the counter, applying a logic 1 output from filter/detector 110 to the R input of the first and second counters 112 and 114, respectively, as an input to AND gate 120, and as an input to AND gates 130 and 132. With the application of a logic 1 input to AND gate 120 between the fourth and fifth counts, AND gate 120 applies a logic 1 output to one-shot circuits 126 and 128.

The output of one-shot 126 is a logic 1 pulse 127 (FIG. 10A) applied as an input to the T input of track-hold circuit 119. As can be seen from FIG. 10A, the track-hold circuit is normally in its hold mode with an output shown at 125, that output being the previous level at which the trackhold circuit went into its hold mode after tracking the synchronized ramp voltage of ramp generator 118. Upon application of the trigger pulse 127 from one-shot 126, track-hold circuit 119 immediately tracks the synchronized ramp voltage from ramp generator 118 during the time interval of the one-shot pulse 127. The output of track-hold circuit 119 during the tracking interval is shown at 129. Upon cessation of the one-shot pulse 127, a logic 1 is applied from the alternate output of one-shot 126 to the H input of track-hold circuit 119, thereby putting the circuit back into its hold mode, where the output of the circuit holds at the last level reached during the track mode, i.e., level 131 shown in FIG. 10A, until another one-shot pulse 127 is received. The output of the track-hold circuit 119 is a measure of the bearing B' of an intruding aircraft which is applied out for use in the PWI circuitry as shown in FIG. 4, and to other circuitry that will be hereinafter further explained. Since the bearing signal B' is decoded at point 159 as the $f_1$ frequency 54 (see FIG. 3) instead of at point 59 where it was encoded, there is a 4 microsecond delay between the relative times for encoding and decoding the bearing signal, but it is a simple matter to compensate for this delay by merely offsetting the synchronized output of the ramp generator 118 by an amount equal to compensate for the 4 microsecond delay time period. This is shown at 133 in FIG. 10A. The triggering of one-shot 128, which is a 506-microsecond time period one-shot, applies a logic 1 input to AND gate 130, thereby enabling the gate. At the same time, the output of AND gate 120 is applied out to other associated circuitry as a report-start signal for purposes to be hereinafter further explained. It will be noted that the report-start signal occurs at point 159, which is the end of time period $t_1$ as shown in FIG. 3.

Meanwhile, while the counters were counting during the first $f_1$ frequency occurrence, the second counter 114 may count to a maximum of four and then was reset by the first occurrence of frequency $f_2$. As will be hereinafter further explained, counter 114 will not be reset after the end of each encoded signal group and may not count during the time period $t_1$ of the first occurrence of $f_1$ since it will take another occurrence of $f_2$ to reset counter 114. But counter 114 functions only to detect time period $t_3 + t_1$ of $f_1$, the second occurrence of the $f_1$ frequency in a signal group. Accordingly, whether or not counter 114 counts during the first occurrence of the $f_1$ frequency is not critical, as will be hereinafter explained. Counter 114 is a four-bit counter that can count to a maximum of 15. When counter 114 has counted to four, the third bit output from counter 114 is applied as a logic 1 input to AND gate 132, but neither the second nor the fourth bits has a logic 1 output applied as inputs to AND gate 132, thereby disabling the gate. The first occurrence of $f_2$ frequency will reset counter 114 and will not produce an output from disabled AND gate 132.

Figure 10B:
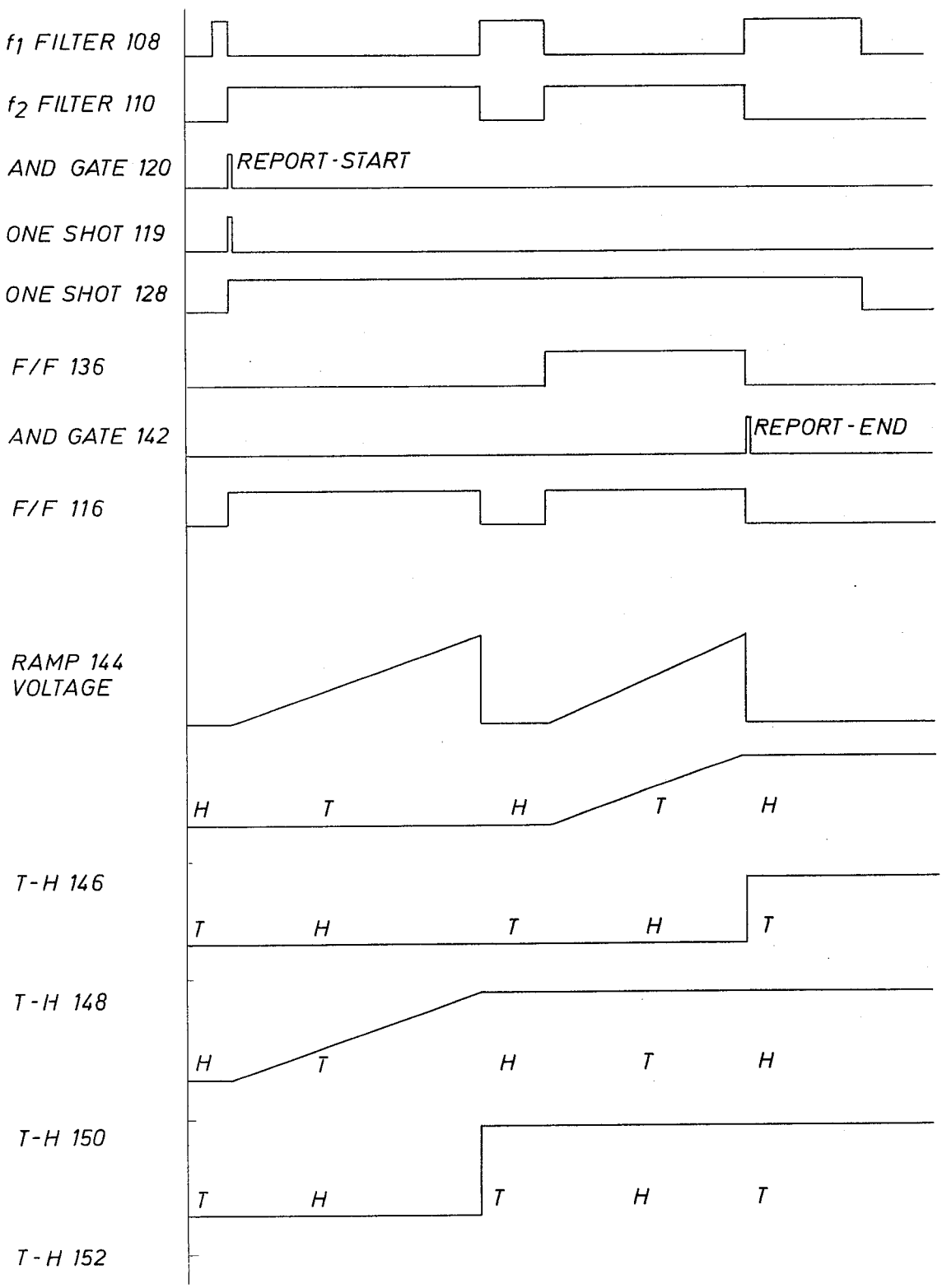

During the first occurrence of $f_1$, as was hereinabove described, a logic 1 input was applied to the R input of flip-flop 116. With flip-flop 116 reset, the output of the flip-flop through conductor 117 is a logic 1 applied to the R input of ramp generator 124. As long as there is a logic 1 reset input to ramp generator 144 the output of the ramp generator 144 will remain at zero as shown in FIG. 10B. The output of filter/detector 108 was also applied as a reset input to flip-flop 136, causing a logic 1 output to be applied from flip-flop 136 through conductor 139 to electronic switch 138. A logic 0 output is applied through conductor 141 from flip-flop 136 to the input of electronic switch 137. Electronic switches 137 and 138 may conveniently be field effect transistors (FET's) utilized in a switching mode. With a logic 1 applied to the trigger input of electronic switch 138, the output of ramp generator 144 is applied through switch 138 to the input of track-hold circuit 150. The logic 1 output from flip-flop 116 through conductor 117 is also applied to the H input of track-hold circuit 150 and the T input of track-hold circuit 152. The output of track-hold circuit 150 is applied as an input to track-hold circuit 152. The two series connected track-hold circuits act as a buffer circuit to generate the range signal upon the occurrence of the $f_2$ frequency during time period $t_2$. However, since all of the above described operation has been taking place during the occurrence of $f_1$, electronic switch 138 is open, allowing the zero ramp generator voltage to be applied to track-hold circuit 150 the output of which is holding at zero. Therefore, the output of track-hold circuits 150 and 152 remain at zero as shown in FIG. 10B during the first occurrence of the $f_1$ frequency.

Upon the first occurrence of the $f_2$ frequency, between the fourth and fifth counts, as hereinabove described, the logic 1 output from $f_2$ filter/detector 110 is applied as an input to enabled AND gate 130, which in turn applies a logic 1 input to the S input of flip-flop 116. Upon being set, flip-flop 116 now applies a logic 1 output through conductor 115 to the T input of track-hold circuit 150 and the H input of track-hold circuit 152. The other output of flip-flop 116 through conductor 117 now changes to a logic 0 which is applied to the R input of ramp generator 144. With a logic 0 applied to ramp generator 144, the ramp generator begins to generate a ramp voltage which is applied as an input to electronic switches 137 and 138. However, since flip-flop 116 still remains in its state above described, the output of ramp generator 144 is applied only through electronic switch 138 as an input to track-hold circuit 150. Track-hold circuit 150 now tracks the ramp generator voltage while track-hold circuit 152 holds at the previous level tracked as shown in FIG. 10B. Track-hold circuit 150 continues to track the ramp generator voltage and circuit 152 continues to hold at its previous voltage level during the first occurrence of the $f_2$ frequency during the $t_2$ time period shown as 55 in FIG. 3. The output of track-hold circuit 152 is the range R' of an intruding aircraft which is applied to the PWI circuitry as shown in FIG. 4 and for use in other circuitry as will be hereinafter further described.

Upon the second occurrence of the $f_1$ frequency, a logic 1 output will be applied from filter/detector 108 to the S inputs of counters 112 and 114, as an input to AND gate 142, and as a reset pulse to the R input of flip-flop 116, changing the state of flip-flop 116. The counters 112 and 114 begin a counting sequence, and since this is the second occurrence of $f_1$ frequency during the time periods $t_3$ and $t_1$, which will be a minimum of 14 microseconds or longer, typically longer and probably on the order of 20–30 microseconds, it can be seen that AND gate 120 will be enabled up to the count of four, but since an $f_2$ frequency does not occur then, AND gate 120 will never produce an output because once the fourth count is passed, AND gate 120 will always be disabled by either the outputs of OR gate 122 or the output of exclusive OR gate 124 throughout the entire counting range of counter 112. However, counter 114 begins to count and as soon as it has counted to 14, the second, third and fourth bit inputs to AND gate 132 are a logic 1 and remain at that level since the counter counts to a maximum of 15 and will remain in that state until reset. AND gate 132 is therefore enabled, and upon the second occurrence of $f_2$ frequency, the logic 1 input applied from filter/detector 110 to enabled AND gate 132 causes a logic 1 input to be applied to the S input of flip-flop 136. At the same time of the second occurrence of $f_2$ frequency, a logic 1 is also applied from the filter/detector 110 as an input to the R input of counter 114, thus resetting the counter.

With flip-flop 136 now set, the output of flip-flop 136 applied through conductor 141 is a logic 1 as applied to electronic switch 137, thereby opening electronic switch 137. Simultaneously, with the occurrence of the second $f_2$ frequency, a logic 1 is applied as an input to the enabled AND gate 130 (which is still enabled by the output of the 506-microsecond one-shot 128) and a logic 1 output from AND gate 130 is applied to the S input of flip-flop 116. With flip-flop 116 set, a logic 0 output is applied through conductor 117 to the R input of ramp generator 144, causing the generator to generate a ramp voltage waveform which is applied as inputs to electronic switches 137 and 138. Since only switch 137 is now open, the ramp voltage is applied via electronic switch 137 as an input to track-hold circuit 146. With flip-flop 116 set, a logic 1 output is applied through conductor 115 to the T input of track-hold circuit 146 and to the H input of track-hold circuit 148. The output of track-hold circuit 146 is applied as an input to track-hold circuit 148, the output of which is applied out as the altitude signal A' of an intruding aircraft. The altitude signal A' is utilized in the PWI circuitry as shown in FIG. 4, and to other circuitry as will be hereinafter further explained.

During the second occurrence of $f_1$ frequency during time periods $t_3$ and $t_1$, flip-flop 116 applies a logic 1 output to the ramp generator 144 causing it to hold its output at zero volts. Simultaneously, a logic 1 is applied to the H input of track-hold circuit 146 and to the T input of track-hold circuit 148, but since the input to track-hold circuit 146 was zero volts, the outputs of both track-hold circuits 146 and 148 will be at zero volts, as shown in FIG. 10B, until the second occurrence of frequency $f_2$ which contains the altitude information. Upon the second occurrence of the $f_2$ frequency, flip-flop 116 has been set as above described, and the track-hold circuit 146 begins to track the ramp voltage of generator 144 while track-hold circuit 148 holds at its previous voltage level. This action occurs throughout the time period $t_4$ of the second occurrence of the $f_2$ frequency as shown at 57 in FIG. 3. During the second occurrence of $f_2$ frequency in time period $t_4$, flip-flop 136 is set as above described, and a logic 1 output is applied to the S input of flip-flop 140, the logic 1 output of which is applied to AND gate 142, thus enabling AND gate 142. When the $f_1$ frequency occurs for the third time, the counters 112 and 114 are set and begin counting as hereinabove described. In addition, a logic 1 input is applied to a second input of enabled AND gate 142 which in turn produces a logic 1 output applied to other associated circuitry as a report-end signal for purposes to be hereinafter further described. It will be noted that the report-end signal occurs at point 159' of the third occurrence of $f_1$ shown at 58 in FIG. 3. The logic 1 output of the filter/detector 108 is also applied to the R input of flip-flop 136, changing the state of the flip-flop and switching off electronic switch 137 and switching on electronic switch 138 in preparation for the receipt of the next signal group and preparing track-hold circuits 150 and 152 to receive and monitor the range information of the next signal message. The logic 1 output of filter detector 108 is also applied to the R input of flip-flop 116, the logic 1 output of which is applied through conductor 117 to the H input of track-hold circuit 146 and to the T input of track-hold circuit 148, causing track-hold circuit 148 to track the now holding track-hold circuit 146 which is holding at the value of the ramp voltage reached just prior to the switching of the modes of operation of track-hold circuits 146 and 148. The output of track-hold circuit 148 is now the measure of the intruding aircraft's altitude A' and is applied out to other circuitry for use in the PWI circuitry of FIG. 4 and for purposes to be hereinafter further described.

The report-end signal is also applied as an R input to flip-flop 140, changing the output of flip-flop 149 and disabling AND gate 142. Since the third occurrence of $f_1$ frequency as shown at 58 in FIG. 3 will last during time period $t_5$ which is at least 10 microseconds or longer, and generally will run probably on the order of 15–30 microseconds or greater, AND gate 120 will not be enabled after the fourth count, and since no $f_2$ frequency output has been received by AND gate 120, the gate will not produce an output after the third occurrence of $f_1$ frequency. However, AND gate 132 may be enabled, but with no input from the $f_2$ filter/detector 110, AND gate 132 will not produce a logic 1 output after the third occurrence of the $f_1$ frequency during the time period $t_5$. As was previously described, the time period $t_0$ is 255 microseconds, and the total signal group time period is $2t_0$, i.e., 510 microseconds. One-shot 128 functions to mark the entire time period $2t_0$. One-shot 128 produces an output during 506 microseconds, which when added to the 4 microsecond time period of the first occurrence of the frequency $f_1$, equals the $2t_0$ time period of 510 microseconds. When the output of one-shot 128 ends, AND gate 130 is disabled and the entire circuitry is now prepared to receive another position location message signal group, comprising $f_1$ and $f_2$ frequencies.

Counter 114 will remain at its full counting capacity after the third occurrence of $f_1$ frequency, since no $f_2$ frequency was received to reset the counter. Accordingly, upon the occurrence of another $f_1$ frequency during time period $t_1$, counter 114 will not count but will await the first occurrence of $f_2$ frequency during time period $t_2$ to reset the counter for operation during $f_1$ frequency time periods $t_3 + t_4$ and $t_5$.

Referring now to FIGS. 1, 4, 12 and 13, a CAS will be described that can utilize a CRT display to show all aircraft within a region with respect to the control VORTAC station. In FIG. 12, the reference phase sinewave is received from VOR resolver 14 and applied as one input to a track-hold circuit 176. The reference phase is also applied as an input to a 90° phase shift circuit 174 which shifts the reference phase sinewave 90° and applies it as an input to a second track-hold circuit 178. The range R' of an aircraft intruding within the safety envelope surrounding the receiving aircraft will be applied from decoder 28 as one input to electronic switch 189. Range R of the receiving aircraft is received from DME receiver 18 and applied as an input to a second electronic switch 190. Switches 189 and 190 may each conveniently be a field effect transistor (FET) to be utilized in a switching function. If the intruding aircraft is within the $\Delta A$ established by the altitude control 41 (see FIG. 4), a logic 1 output will be received from altitude comparator 42 and applied through conductor 167 as one input to AND gate 181, thus enabling the gate. When a report-start signal is received from decoder 28, it is applied as an R input to flip-flop 180 which applies a logic 1 output through conductor 179 to the hold (H) input of track-hold circuits 176 and 178. The output of the track-hold circuits 176 and 178 in the hold mode will be the voltage of the reference phase sinewave and its 90° shifted counterpart at which the circuits start the hold function. This voltage is applied from circuits 176 and 178 as inputs to multiplying circuits 187 and 188, respectively.

When a report-end signal is received from decoder 28, a logic 1 input will be applied to a second input of AND gate 181 and will also be applied to electronic switch 189 to pass the range R' of the intruding aircraft as an input to multiplying circuits 187 and 188. When the report-end signal is applied to enabled AND gate 181, a logic 1 input is applied to OR gate 182 which in turn will trigger one-shot 184 and apply a logic 1 pulse to the S input of flip-flop 180 through conductor 183, and also will apply an "unblanking" pulse through conductor 185 to the CRT display unit 186, thus unblanking the CRT screen for the time duration of the one-shot pulse to display intruding aircraft information. When the logic 1 input is applied to the S input of flip-flop 180, the flip-flop changes state and a logic 1 output is applied through conductor 177 to the "track" (T) inputs of track-hold circuits 176 and 178. The track-hold circuit 176 tracks the reference phase sinewave signal and the track-hold circuit 178 tracks the 90° shifted counterpart of the reference phase until another report-start signal is received from decoder 28 and applied to the R input of flip-flop 180. The track-hold circuits 176 and 178 produce an output corresponding to the point on the reference phase sinewave and its 90° shifted counterpart that is being tracked by the track-hold circuits 176 and 178 and is an indication of the bearing of the intruding aircraft. The outputs of the track-hold circuits 176 and 178 are applied as inputs to multiplying circuits 187 and 188, respectively, where the bearing information from the track-hold circuits 176 and 178 is multiplied by the range of the intruding aircraft as it is applied from decoder 28 through electronic switch 189. The multiplied range and bearing signals are applied as signal inputs to the X and Y traces of CRT display device 186 for displaying a track of the intruding aircraft 198 with respect to the center of the CRT screen which represents the location of the control VORTAC.

When a controller pulse from controller 16 is received, it is applied through conductor 71 as one input to OR gate 182, as an input to electronic switch 190, and also as an input to display device 186. The application of the control pulse to electronic switch 190 applies range R information from DME receiver 18 to the multiplying circuits 187 and 188. Concurrently, the application of the logic 1 input to OR gate 182 causes the triggering of one-shot 184 which applies an "unblank" pulse via conductor 185 to display means 186 and also causes the logic 1 pulse to be applied through conductor 183 to the S input of flip-flop 180. The triggering of flip-flop 180 applies a logic 1 output through conductor 177 to the track inputs of track-hold circuits 176 and 178. The bearing information outputs of the track-hold circuits 176 and 178 are applied as inputs to the multiplying circuits 187 and 188, respectively, where the range information R is multiplied by the bearing information of the receiving aircraft and applied as $X$ and $Y$ inputs to CRT display 186 as target trace 200. The location trace is displayed on the CRT screen of device 186 the time period that the screen in unblanked by the pulse from one-shot 184. Because of the memory characteristics of the CRT, the last display will be visible when a new target location is again displayed and the trail of the displayed aircraft can easily be seen.

Figure 13:
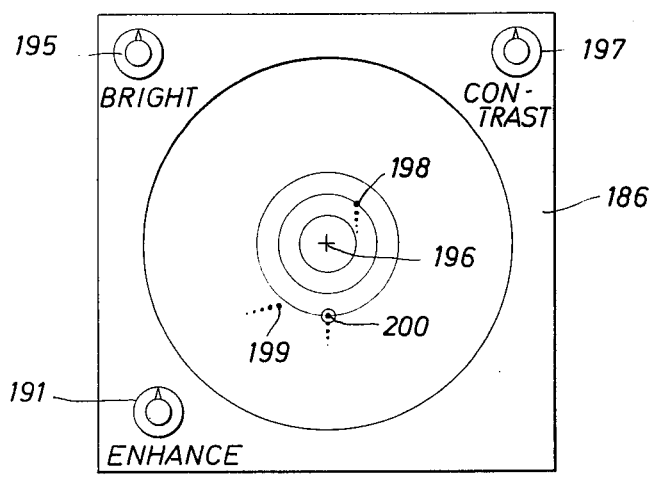
FIG. 13 illustrates an airborne aircraft regional collision avoidance CRT display.
Figure 14:
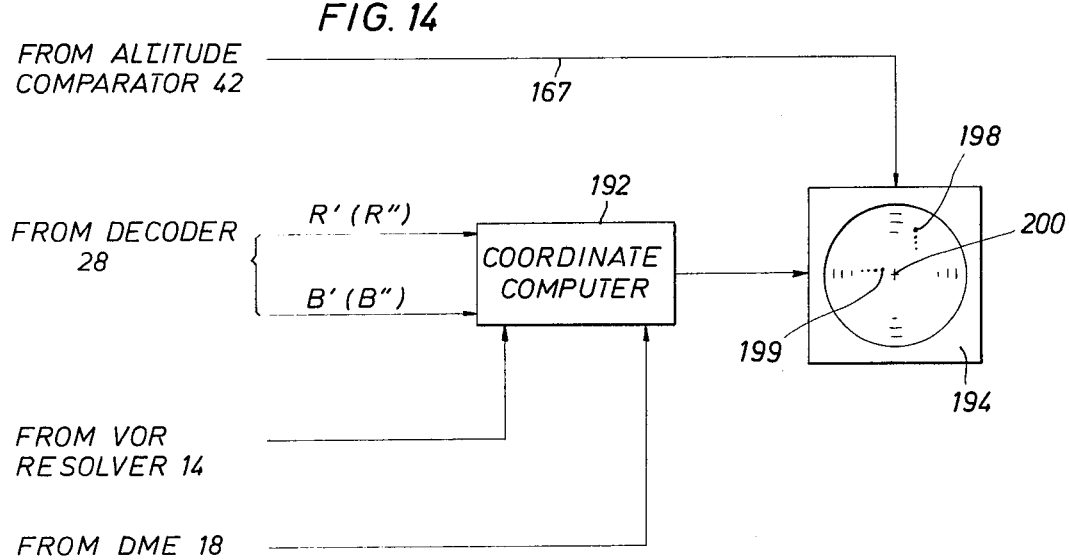
FIG. 14 is a block diagram of an airborne area collision avoidance system for use with the circuitry shown in FIG. 4.
Figure 15:
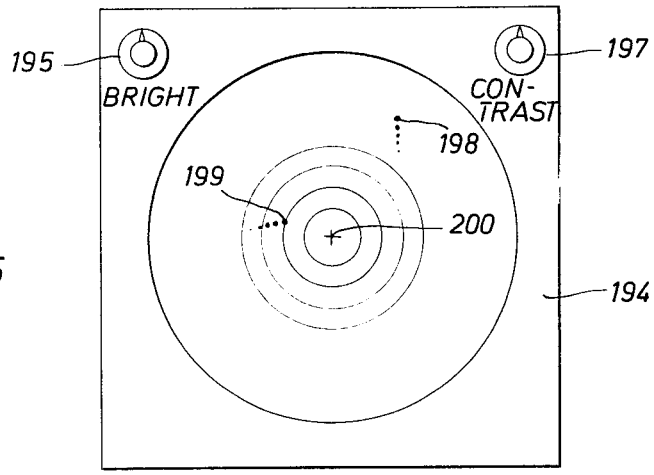
FIG. 15 illustrates an airborne aircraft area collision avoidance CRT display.

Tracks 198 and 200 shown on device 186 in FIGS. 12 and 13 are target plots of aircraft $P_3$ and $P_1$, respectively, as shown in FIG. 1. Aircraft $P_2$ would be displayed as target 199. As described above, the memory characteristic of the CRT will cause the aircraft targets to leave a trail, thus showing the direction of flight. The target plots are shown displayed with relation to the center of the screen 196 which is the relative location of the VORTAC station. The input from the controller 16 to display device 186 may be utilized to enhance, through conventional techniques, the track of the receiving aircraft so that the pilot in the receiving aircraft will see his aircraft's position track enhanced or as a brighter spot on the screen. Other commonly utilized means of marking the receiving aircraft's position such an encircling the position with a bright circle may also be utilized to enhance the received aircraft's target track. In FIG. 13, the targets 198, 199 and 200 (aircraft $P_3$, $P_2$ and $P_1$, respectively, of FIG. 1) are shown displayed with respect to the control VORTAC location at 196. Thus all aircraft within the region of the VORTAC may be displayed for appropriate interpretation and possible collision avoidance maneuvers where appropriate. Device 186 has conventional brightness, contrast and enhance controls 195, 197 and 191, respectively.

Referring now to FIGS. 1, 4, 14 and 15, a means of displaying intruding aircraft within the selected safety envelope of the receiving aircraft is shown. The display means provides an area display showing target "intruding" aircraft displayed with respect to the receiving aircraft. Bearing information B is received from VOR resolver 14 and applied as one input to a coordinate computer 192. Similarly, range information R is received from DME receiver 18 and applied as a second input to coordinate computer 192. The bearing signal B' and range signal R' of an intruding aircraft (aicraft $P_2$ in FIG. 1 or bearing B'' and R'' of aircraft $P_3$ in FIG. 1) are received from decoder 28 and applied as inputs to the coordinate computer 192. The coordinate computer 192 shown in FIG. 14 may conveniently be any polar coordinate computer such as an ARNAV computer of the type described in U. S. Pat. No. 3,414,901, for example. A Cartesian coordinate computer may also be used to supply the necessary location information to the CRT area display device 194. The polar coordinate computer is preferred in this invention, since the information being supplied by the system is the parameters of the polar coordinate system, namely, bearing and range. A signal from altitude comparator 42 (see FIG. 4) is applied through conductor 167 to the CRT device 194 to unblank the screen when the aircraft is within the $\Delta A$ established for the safety envelope.

The CRT area display device 194 utilizes an aircraft indicia 200 which is controlled electronically by a compass system (not shown). The aircraft indicia 200 rotates at the center of the face of the CRT display device 194 and continuously indicates the orientation of the receiving aircraft relative to magnetic north. The aircraft indicia 20 is electronically controlled or rotated by suitable electronic relfection means in a conventional manner. The traces for the presentation of aircraft shown in the area display are presented as small bright targets which leave a trail, thus showing the direction of flight as indicated by tracks 199 and 198, representing aircraft $P_2$ and $P_3$ of FIG. 1, respectively. The display device 194 would have conventional brightness and contrast controls 195 and 197, respectively.

Figure 16:
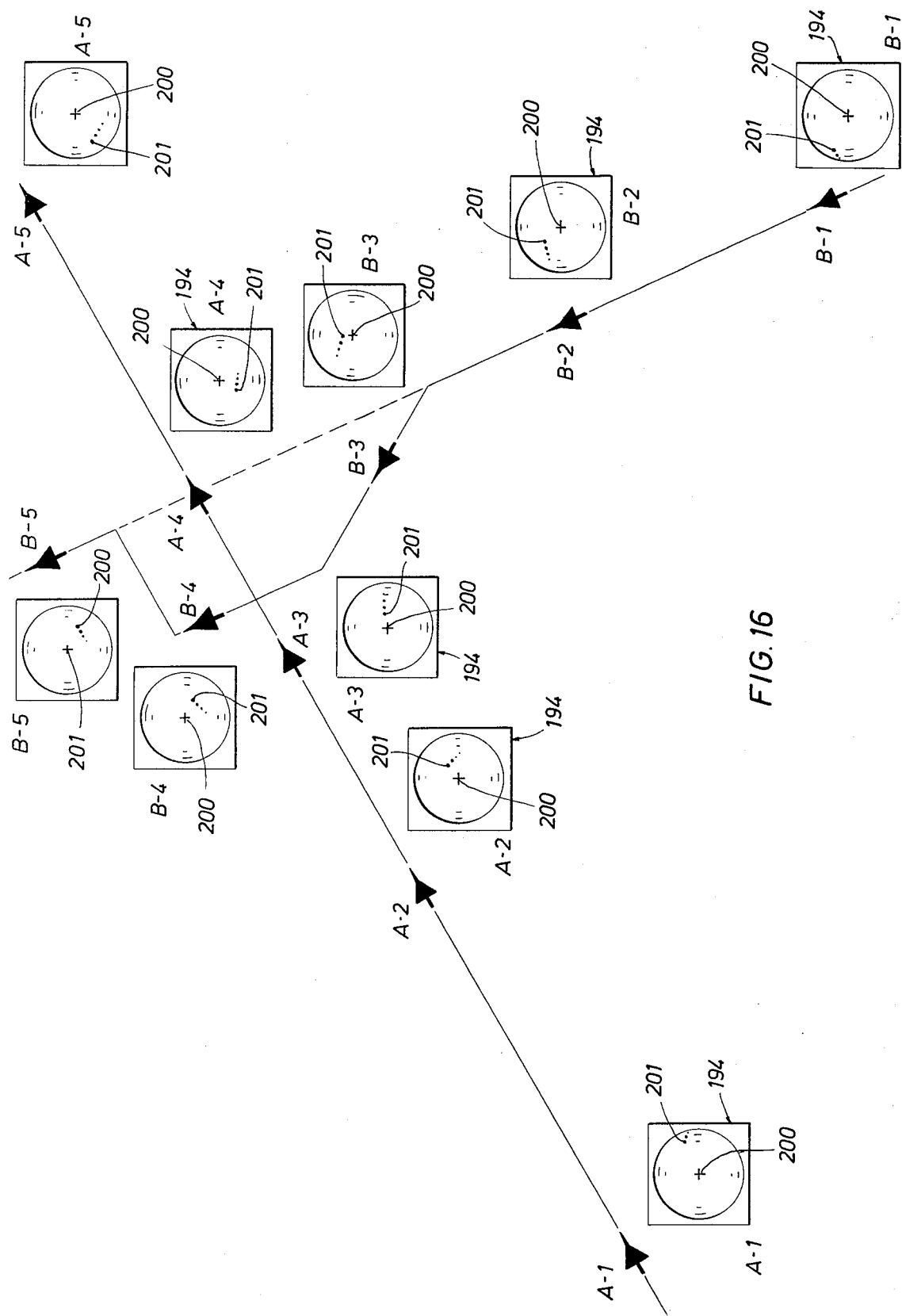
FIG. 16 illustrates an airborne aircraft area collision avoidance display presentation for a collision avoidance maneuver.

FIG. 16 indicates the CRT area display during a collision avoidance maneuver between a pair of aircraft A and B. In FIG. 16, each of the aircraft contain CAS equipment and area displays, according to this invention, although it should be realized that if either of the aircraft has only the aircraft PWI system as shown in FIG. 4, or the basic transmitter system as shown in FIG. 2, the collision avoidance maneuver may be made by the aircraft having this CAS system with area display. At positions 1, aircraft A and B are flying on different headings that converge at a common point. Aircraft B observes an intruder 200 forward and on a closing course from the left. At the same time, aircraft A, at position 1, observes an intruder 201 forward and on a closing path from the right. Each aircraft continuously monitor the position of the other aircraft and under established and conventional rules of the road, aircraft B takes a collision avoidance maneuver, as shown. It is to be realized, of course, that rules of the road and procedures may be adopted as desired for maximum efficiency and safety. FIG. 16 merely illustrates the particular manner in which the invention may be utilized to prevent a collision.

The CAS system above described may be utilized as an aircraft position reporting system for controlling separation between aircraft for air traffic control. Presently, air traffic control is primarily based on the use of a ground radar system for determining aircraft position and separation between aircraft. This ground based radar system requires many long-range radar systems to cover the en-route area and short-range radar systems to give specific coverage in heavily congested air traffic terminal areas. However, many aircraft do not present good radar reflections and in some areas of the United States, the present radar system does not provide adequate coverage. The above CAS system may be utilized as an aircraft position reporting system and would greatly improve the air traffic control system presently in use. The extensive coverage, detection and reporting features of the present invention would provide the air traffic controller and pilots with more reliable information, thus easing the burden on air traffic controllers that exists at the present time.

The CAS system of this invention does not use radar as its primary information input and is therefore not affected by the problems normally encountered with radar, and the display data is much more reliable. The CAS system provides a current and up-to-date picture of the complete air traffic situation because of the increased frequency of the reports and due to their extremely high reliability. Thus, the CAS system may be used as a continuous check on the accuracy of the radar system by air traffic controllers. Also, the CAS system could serve as a reliable backup surveillance system when the radar system fails.

The PWI and CAS systems could be utilized to transmit information to ground air traffic control facilities at selected ground stations. When the pilot of an aircraft which is equipped with a PWI or CAS system according to this invention tunes high VOR/DME receiver to the frequency of the selected ground control VORTAC station, for normal navigational purposes, he could be automatically connected into an aircraft position reporting system to be utilized by ground air traffic control. The PWI and CAS information, in the form of aircraft position reporting information, could be transmitted to the appropriate ground air traffic control stations for link-up with a central computerized system, where the information for all such reporting aircraft could be relayed to the appropriate regional air traffic control stations for their use in controlling air traffic. This information may further be utilized to calculate flight times and estimated arrival times from terminal to terminal for calculations of density of air traffic at various terminals within the United States and other countries. The utilization of various computers, display devices, and other presentation means could conveniently be implemented based on the present state of the art and standard encoding, decoding and utilization apparatus may be installed as required.

Numerous variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. An aircraft position reporting system comprising
   an airborne VOR receiver for receiving bearing information signals from a ground station,
   an airborne DME receiver for receiving range information signals from said ground station,
   an airborne altimeter,
   resolver means connected to said VOR receiver for resolving said bearing signals into variable phase and reference phase sinewave components,
   a telemetry receiver for receiving position location messages from other aircraft,
   controller means receiving said variable phase output from said resolver means and said received position location messages from said telemetry receiver for generating an output signal representative of the bearing of the aircraft synchronized in time relation to the transmission of position location messages by said other aircraft,
   a telemetry transmitter, and
   encoder means connected to said telemetry transmitter and receiving inputs from said DME receiver and altitude transducer and receiving said controller output signal for encoding said bearing, and altitude information and controlling the operation of said telemetry transmitter for transmitting said encoded information as a position location message reporting the location of the aircraft with respect to said ground station.

2. The aircraft position reporting system as described in claim 1, further comprising
   decoder means connected to said telemetry receiver for receiving said position location messages of said other aircraft and receiving said reference phase output from said resolver for decoding said position location messages and generating signals representative of the bearing and range of said other aircraft with respect to said ground station, and further generating a signal representative of the altitude of said other aircraft,
   said controller circuit receiving said telemetry receiver output and generating an output signal for application to said encoder means representative of the bearing of the receiving aircraft only when no position location message is being received by said telemetry receiver.

3. The aircraft position reporting system as described in claim 2, wherein said controller means comprises
   squaring circuit means receiving said variable phase sinewave from said resolver and generating a square wave output,
   means for generating positive going pulses representative of the zero crossing in a positive going direction of said square wave.
   a counter receiving said positive going pulses for counting a predetermined number of said pulses and generating an output signal in response to said predetermined count,
   signal detector means receiving the output of said telemetry receiver for generatng a signal when no position location message is detected, and
   gating means receiving as inputs said positive going pulses, said counter signal output and said signal detector means output signal for generating an output signal when said inputs occur simultaneously, the output signal of said gating means also being applied as a reset input to said counter.

4. The aircraft position reporting system as described in claim 2, further comprising
   coordinate computing means receiving the bearing and range signals of said other aircraft from said decoder and receiving the bearing signal of the receiving aircraft from said VOR resolver means and the range signal of the receiving aircraft from said DME receiver for generating output signals representative of the coordinate location of said other aircraft with respect to the receiving aircraft, and display means receiving said coordinate computing means output for visually displaying the location of said other aircraft with respect to the receiving aircraft.

5. The aircraft position reporting system as described in claim 2, further including
   visual display means, and
   circuit means receiving inputs of bearing and range of said other aircraft from said decoder means, bearing and range of the receiving aircraft from said VOR resolver and DME receiver, position location message start and end signals from said decoder means and a controller means output signal for generating signals applicable to said display means for displaying the location of said other aircraft and the receiving aircraft with respect to said ground station.

6. The aircraft position reporting system as described in claim 5, wherein said circuit means comprises a pair of "track-hold" circuit means,
 a VOR reference phase input from said VOR resolver applied to one of said "track-hold" circuit means,
 a 90° phase shift circuit receiving said VOR reference phase input and applying the phase shifted output to said other "track-hold" circuit means,
 a pair of multiplying circuits, each one of which receives the output of one of said "track-hold" circuit means, the outputs of said multiplying circuits being applied as inputs to said visual display means, a pair of electronic switching circuits, one of said circuits receiving the range signal of the receiving aircraft and applying its output to a second input of each of said multiplying circuits, another one of said switching circuits receiving the range signal of said other aircraft and applying its output to a second input of each of said multiplying circuits, said one switching circuit receiving as a switching input said controller means output signal, said another switching circuit receiving as a switching input said position location message end signal from said decoder means,
 first gate means receiving said output signal from said altitude comparator and said position location message end signal from said decoder and generating an output signal when both said altitude comparator and message end signals are present,
 second gate means receiving the output signal of said first gate means and said controller means output signal for generating an input signal if either of said signals are applied as inputs, and
 switching circuit means responsive to the output signal of said second gate means and said position location message start signal and connected to both said track-hold circuits means for switching said circuit means between the track and hold modes of operation.

7. The aircraft position reporting system as described in claim 6, wherein said circuit means further comprises an output from said switching circuit means applied as an input to said visual display means for unblanking said display means during a predetermined time interval during which the location information of said other aircraft or the receiving aircraft are applied to said display means.

8. The aircraft position reporting system as described in claim 2, wherein said controller means output signal occurs simultaneously with the occurrence of a zero crossing in a positive going direction of said variable phase sinewave component of said VOR signal, the occurrence of said controller signal in time relationship with said reference phase sinewave component being a measure of the bearing of the aircraft receiving said VOR signals.

9. The aircraft position reporting system as described in claim 2, wherein the synchronization of said encoded position location message is dependent on the phase relationship between said variable phase and reference phase sinewave components of said VOR signals.

10. The aircraft position reporting system as described in claim 2, wherein the initiation of a position location message as transmitted by said telemetry transmitter in time relation to said VOR signal reference phase sinewave component is a measure of the bearing of the aircraft transmitting said message.

11. A method of reporting an aircraft position, comprising the steps of
 receiving bearing information signals from a ground VOR/DME station,
 receiving range information signals from said ground station,
 receiving altitude signals from an airborne altimeter, resolving said bearing signals into variable phase and reference phase sinewave components,
 receiving position location messages from other aircraft,
 controlling the generation of a signal representative of the bearing of the aircraft in response to receiving said variable phase component and position location messages of said other aircraft,
 encoding said bearing, range and altitude signals as a position location message, and
 transmitting over a preselected frequency said position location message indicating the bearing, range and altitude of the aircraft with respect to said ground station.

12. The method as described in claim 11, comprising the additional steps of
 decoding said position location messages from said other aircraft into bearing, range and altitude information with respect to said ground station,
 generating signals representative of the bearing and range of said other aircraft with respect to said ground station, and
 generating a signal representative of the altitude of said other aircraft, said received encoded position location messages from said other aircraft being utilized in controlling generation of a signal representative of the bearing of the receiving aircraft only when no position location message is being received.

13. The method as described in claim 12, comprising the additional steps of
 generating signals representative of the coordinate location of said other aircraft with respect to the receiving aircraft in response to receipt of the bearing and range signals of said other aircraft and the bearing and range signals of the receiving aircraft, and
 visually displaying the location of said other aircraft with respect to the receiving aircraft.

* * * * *